United States Patent
Boon et al.

(10) Patent No.: US 9,644,152 B2
(45) Date of Patent: *May 9, 2017

(54) METHODS AND SYSTEMS FOR SUPPLYING HYDROGEN TO A HYDROCATALYTIC REACTION

(71) Applicant: SHELL OIL COMPANY, Houston, TX (US)

(72) Inventors: Andries Quirin Maria Boon, Amsterdam (NL); Joseph Broun Powell, Houston, TX (US); Lamar Lane Joffrion, Richmond, TX (US); Kimberly Ann Johnson, Sugar Land, TX (US); Hubert Willem Schenck, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 120 days.

This patent is subject to a terminal disclaimer.

(21) Appl. No.: 14/486,021

(22) Filed: Sep. 15, 2014

(65) Prior Publication Data
US 2015/0080626 A1 Mar. 19, 2015

Related U.S. Application Data

(60) Provisional application No. 61/879,422, filed on Sep. 18, 2013, provisional application No. 61/919,033, filed on Dec. 20, 2013.

(51) Int. Cl.
*C10G 1/06* (2006.01)
*C10G 1/00* (2006.01)
(Continued)

(52) U.S. Cl.
CPC ............... *C10G 1/06* (2013.01); *C01B 3/16* (2013.01); *C10G 1/002* (2013.01); *C10G 1/08* (2013.01);
(Continued)

(58) Field of Classification Search
None
See application file for complete search history.

(56) References Cited

U.S. PATENT DOCUMENTS

2008/0142408 A1 6/2008 Eilers et al.
2010/0083575 A1* 4/2010 Varadaraj ................ C10J 3/466
48/209
(Continued)

FOREIGN PATENT DOCUMENTS

CA 2612958 6/2008
CN 10294724 6/2016
(Continued)

OTHER PUBLICATIONS

Doddannavar et al., Practical Hydraulic Systems—Operation and Troubleshooting for Engineers and Technicians—Pressure and Flow, Elsevier, 2005, pp. 16-19.*
(Continued)

*Primary Examiner* — In Suk Bullock
*Assistant Examiner* — Philip Louie

(57) ABSTRACT

A bottom fraction of a product of a hydrocatalytic reaction is gasified to generate hydrogen for use in further hydrocatalytic reactions. In one embodiment, an overhead fraction of the hydrocatalytic reaction is further processed to generate higher molecular weight compounds. In another embodiment, a product of the further processing is separated into a bottom fraction and an overhead fraction, where the bottom fraction is also gasified to generate hydrogen for use in further hydrocatalytic reactions.

18 Claims, 10 Drawing Sheets

(51) Int. Cl.
*C10L 1/04* (2006.01)
*C10K 3/04* (2006.01)
*C10G 3/00* (2006.01)
*C10J 3/54* (2006.01)
*C10J 3/74* (2006.01)
*C10L 1/02* (2006.01)
*C10G 1/08* (2006.01)
*C01B 3/16* (2006.01)

(52) U.S. Cl.
CPC ............... *C10G 1/083* (2013.01); *C10G 3/42* (2013.01); *C10G 3/52* (2013.01); *C10J 3/54* (2013.01); *C10J 3/74* (2013.01); *C10K 3/04* (2013.01); *C10L 1/02* (2013.01); *C10L 1/04* (2013.01); *C01B 2203/0288* (2013.01); *C01B 2203/043* (2013.01); *C01B 2203/0405* (2013.01); *C01B 2203/046* (2013.01); *C01B 2203/0475* (2013.01); *C01B 2203/148* (2013.01); *C01B 2210/001* (2013.01); *C01B 2210/0009* (2013.01); *C01B 2210/0014* (2013.01); *C01B 2210/0025* (2013.01); *C10G 2300/1014* (2013.01); *C10G 2300/301* (2013.01); *C10G 2300/302* (2013.01); *C10G 2300/42* (2013.01); *C10J 2300/1223* (2013.01); *C10J 2300/1823* (2013.01); *C10L 2200/0469* (2013.01); *C10L 2290/02* (2013.01); *C10L 2290/10* (2013.01); *Y02E 50/32* (2013.01); *Y02P 20/145* (2015.11); *Y02P 30/20* (2015.11)

(56) References Cited

U.S. PATENT DOCUMENTS

| | | |
|---|---|---|
| 2010/0236988 A1 | 9/2010 | Gabrielov et al. |
| 2011/0154721 A1 | 6/2011 | Chheda et al. |
| 2011/0167713 A1 | 7/2011 | Quignard et al. |
| 2012/0036764 A1* | 2/2012 | Babe .................. C01B 3/04 44/307 |
| 2012/0152836 A1 | 6/2012 | Powell et al. |
| 2012/0156743 A1 | 6/2012 | Powell et al. |
| 2013/0109896 A1 | 5/2013 | Powell et al. |
| 2013/0232853 A1* | 9/2013 | Peterson ............ C07G 1/00 44/307 |
| 2014/0000154 A1 | 1/2014 | Powell |
| 2014/0117276 A1 | 5/2014 | Powell et al. |

FOREIGN PATENT DOCUMENTS

| | | |
|---|---|---|
| WO | 2008113766 | 9/2008 |
| WO | 2013066808 | 5/2013 |
| WO | 2013131916 | 9/2013 |

OTHER PUBLICATIONS

Higman et al., Gasification—Feedstocks and Feedstock Characteristics—4.2.1.13 Viscosity, 2nd Edition, Elsevier, 2008, pp. 67-68.*
Written Opinion of the International Searching Authority dated Dec. 1, 2014 of PCT/US2014/055315.

* cited by examiner

METHODS AND SYSTEMS FOR SUPPLYING HYDROGEN TO A HYDROCATALYTIC REACTION

RELATED APPLICATIONS

This application claims the benefit of U.S. Provisional Application No. 61/879,422, filed on Sep. 18, 2013 and U.S. Provisional Application No. 61/919,033, filed on Dec. 20, 2013, the disclosures of which are incorporated herein by reference in their entirety.

TECHNICAL FIELD

Embodiments of the present disclosure generally relate to a hydrocatalytic reaction and more specifically, to systems and methods supplying hydrogen to the hydrocatalytic reaction through gasification of a fraction of a product stream of the hydrocatalytic reaction.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of any prior art.

A number of substances of commercial significance may be produced from natural sources, including biomass. Cellulosic biomass may be particularly advantageous in this regard due to the versatility of the abundant carbohydrates found therein in various forms. As used herein, the term "cellulosic biomass" refers to a living or formerly living biological material that contains cellulose. The lignocellulosic material found in the cell walls of higher plants is the world's largest source of carbohydrates. Materials commonly produced from cellulosic biomass may include, for example, paper and pulpwood via partial digestion, biofuels, including bioethanol by fermentation.

Development of fossil fuel alternatives derived from renewable resources have received recent attention. Cellulosic biomass has garnered particular attention in this regard due to its abundance and the versatility of the various constituents found therein, particularly cellulose and other carbohydrates. Despite promise and intense interest, the development and implementation of bio-based fuel technology has been slow. Existing technologies have heretofore produced fuels having a low energy density (e.g., bioethanol) and/or that are not fully compatible with existing engine designs and transportation infrastructure (e.g., methanol, biodiesel, Fischer-Tropsch diesel, hydrogen, and methane). Moreover, conventional bio-based processes have typically produced intermediates in dilute aqueous solutions (>50% water by weight) that are difficult to further process. Energy- and cost-efficient processes for processing cellulosic biomass into fuel blends having similar compositions to fossil fuels would be highly desirable to address the foregoing issues and others.

When converting cellulosic biomass into fuel blends and other materials, cellulose and other complex carbohydrates therein can be extracted and transformed into simpler organic molecules, which can be further processed thereafter. Subsequent transforming reactions include various hydrocatalytic reactions, such as hydrogenation and/or hydrogenolysis reactions, which require hydrogen. While external hydrogen can be provided, such a hydrogen source may not help reduce the carbon footprint of any eventual fuel product, such as when it is based on natural gas reforming.

Further, in addition to the desired carbohydrates, other substances may be present within cellulosic biomass that can be especially problematic to deal with in an energy- and cost-efficient manner. For example, during cellulosic biomass processing, the significant quantities of lignin present in cellulosic biomass may lead to fouling of processing equipment, potentially leading to costly system down time. The significant lignin quantities can also lead to realization of a relatively low conversion of the cellulosic biomass into useable substances per unit weight of feedstock.

As evidenced by the foregoing, the efficient conversion of cellulosic biomass into fuel blends and other materials is a complex problem that presents immense engineering challenges. The present disclosure addresses these challenges and provides related advantages as well.

SUMMARY

The present disclosure describes systems and methods supplying hydrogen to a hydrocatalytic biomass conversion reaction through gasification—also known as partial combustion—of a fraction of a product stream of the hydrocatalytic reaction. In a preferred embodiment, the fraction comprises lignin, lignin-derived compounds, and/or unextracted amounts of cellulose and hemi-cellulose. In another embodiment, the product stream fraction subject to gasification can further comprises a $C_{14}$ or greater hydrocarbon, such as an olefin, a paraffin, an aromatic, a cycloalkane, caramels, and/or other oxygenate condensation products. The fraction of the product stream to be gasified can be provided to the gasification zone as one or more input streams. For example, in one embodiment, the gasification zone can have one input comprising lignin, lignin-derived compounds, and/or unextracted amounts of cellulose and hemi-cellulose and another input comprising $C_{14}$ or greater hydrocarbons. In another embodiment, the gasification zone has one input stream comprising lignin, lignin-derived compounds, and/or unextracted amounts of cellulose and hemi-cellulose, as well as an olefin, a paraffin, an aromatic, a cycloalkane, and/or other hydrocarbons with a carbon number of $C_{14}$ or greater, including caramels and other oxygenate condensation products.

According to one aspect of the invention, there is provided a method comprising: (a) providing a biomass feedstock containing cellulose and water; (b) contacting the biomass feedstock with hydrogen in the presence of a catalyst capable of activating molecular hydrogen to form a hydrocatalytically treated mixture. The method further comprises (c) separating the hydrocatalytically treated mixture into at least a first bottom fraction and a first overhead fraction, wherein the first bottom fraction comprises at least one compound having a separation point having a temperature in a range of about 100 to 600 degrees C. and a pressure of about atmospheric pressure; (d) partially oxidizing at least a portion of the first bottom fraction to produce a gas mixture comprising carbon monoxide and hydrogen. The method additionally comprises (e) subjecting at least a portion of the gas mixture to a water gas shift reaction to generate hydrogen and carbon dioxide; and (f) providing at least a portion of the hydrogen from step (e) for use in step (b).

In one embodiment, the first bottom fraction comprises at least one compound having a separation point having a temperature in a range of about 100 to 500 degrees C. and a pressure in a range of about 1 to 100 Torr, preferably about 3 to 20 Torr, such as about 10 Torr. In another embodiment, the first bottom fraction comprises at least one compound having a separation point with a temperature in a range of about 200 to 450 degrees C. and a pressure in a range of about 1 to 100 Torr, preferably about 3 to 20 Torr, such as about 10 Torr.

In one embodiment, the hydrocatalytically treated mixture comprises a plurality of hydrocarbon, including oxygenated hydrocarbon molecules, the method further comprising processing at least a portion of the plurality of hydrocarbons, including oxygenated hydrocarbon molecules, to form a fuel blend comprising a higher hydrocarbon. In another embodiment, the portion of the first bottom fraction subject to partial oxidation comprises lignin, lignin-derived compounds, and/or unextracted amounts of cellulose and hemicellulose. In another embodiment, at least a portion of the first overhead fraction is subject to a further processing reaction to produce a product stream comprising a higher molecular compound.

In yet another embodiment, the method further comprises separating at least a portion of the product stream comprising a higher molecular compound into a second overhead fraction and a second bottom fraction, wherein the second bottom fraction comprises at least one compound having a separation point having a temperature in a range of about 100 to 500 degrees C. and a pressure in a range of about 0.10 to 7 bar, and partially oxidizing at least a portion of the second bottom fraction to produce a gas mixture comprising carbon monoxide and hydrogen. The method further comprises subjecting at least a portion of the gas mixture generated from partial oxidation of at least a portion of the second bottom fraction to a water gas shift reaction to generate hydrogen and carbon dioxide; and providing at least a portion of the hydrogen from the second bottom fraction to step (b).

In one embodiment, the second bottom fraction comprises at least one compound having a separation point having a temperature in a range of about 150 to 400 degrees C. and a pressure in a range of about 0.10 to 7 bar. In another embodiment, the second bottom fraction comprises at least one compound having a separation point having a temperature in a range of about 200 to 400 degrees C. and a pressure in a range of about 0.10 to 7 bar.

In one embodiment, the partially oxidizing step of at least a portion of the first bottom fraction comprises using a gasifier. In another embodiment, the partially oxidizing step of at least a portion of the second bottom fraction comprises using a gasifier. In one embodiment, the gasifier is selected from the group consisting of a moving-bed gasifier, a fluid-bed gasifier, an entrained-flow gasifier, and any combination thereof. In yet another embodiment, the method further comprises routing at least a portion of the first or second bottom fraction to the gasifier, wherein the portion can be a solid, liquid, or a combination thereof. In one embodiment, the gasifier comprises an entrained-flow gasifier and the portion of the first or second bottom fraction is routed as a liquid. In yet another embodiment, the same gasifier is used for the partially oxidizing step of at least a portion of the first bottom fraction and the partially oxidizing step of at least a portion of the second bottom fraction.

In one embodiment, the portion of the first bottom fraction subject to partial oxidation has a viscosity of about 1 to 10,000 centipoises (cP) at a temperature of about 75 degrees C. In another embodiment, the portion of the first bottom fraction subject to partial oxidation has a viscosity of about 100 to 5,000 centipoises (cP) at a temperature of about 75 degrees C. In another embodiment, the portion of the first bottom fraction subject to partial oxidation has a viscosity of about 500 to 1,000 centipoises (cP) at a temperature of about 75 degrees C. In another embodiment, the first bottom fraction subject to partial oxidation has a kinematic viscosity of about 320 centistokes or less (or about 320 centipoises depending on specific gravity) at about the temperature at which the bottom fraction is produced, in one embodiment, it is above about 200 degrees C.

Other advantages and features of embodiments of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

Figure 1:
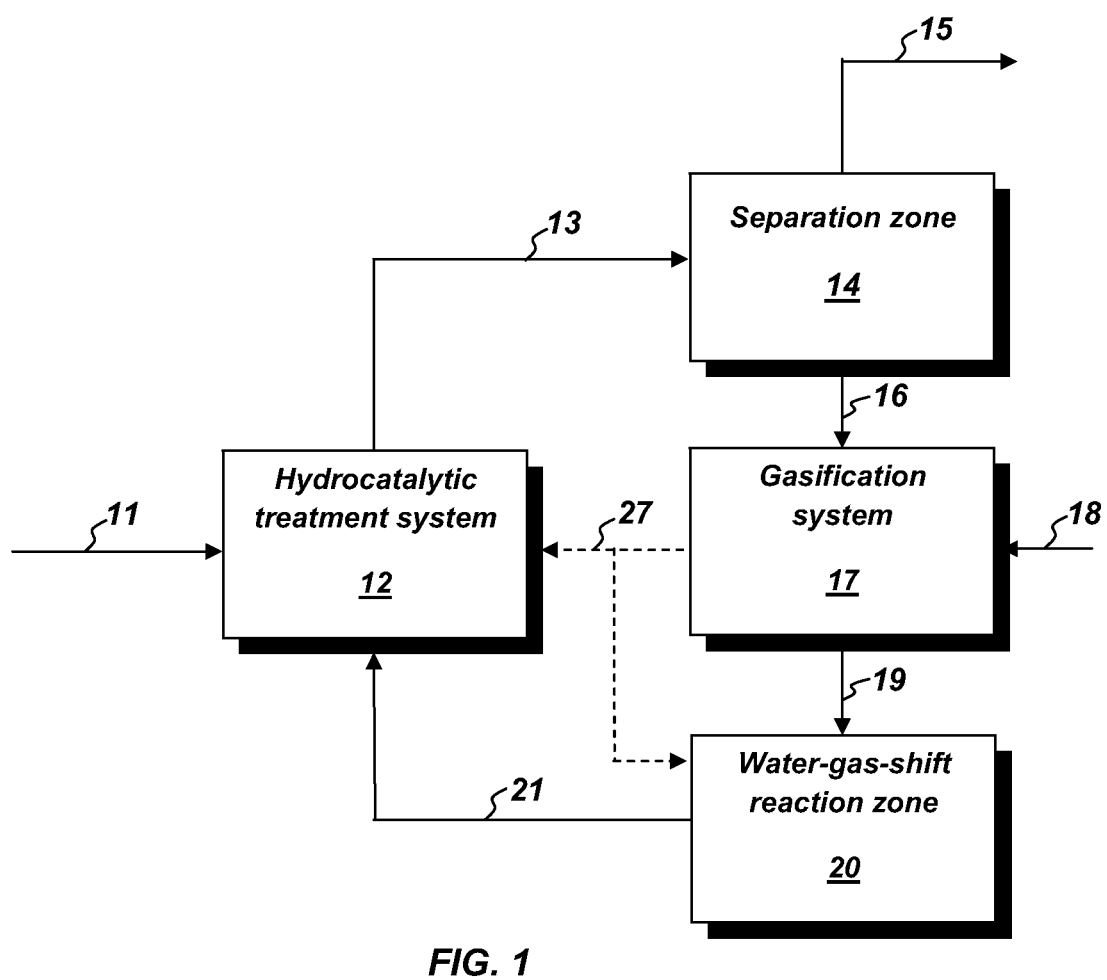
FIG. 1 shows an illustrative schematic of one embodiment to supply hydrogen to a hydrocatalytic reaction through gasification of a fraction of a product stream of the hydrocatalytic reaction according to aspects of the invention.

Embodiments of the present invention relate to systems and methods supplying hydrogen to the hydrocatalytic reaction through gasification of a fraction of the product stream of the hydrocatalytic reaction, preferably a bottom fraction. In a preferred embodiment, the bottom fraction comprises lignin, lignin-derived compounds, and/or unextracted amounts of cellulose and hemi-cellulose. Non-limiting exemplary lignin-derived compounds can include partially depolymerized lignin moieties containing 5-'5, phenylcoumaran, and β-O-4 linkages as characterized by monomeric compounds, phenol, o-cresol, p-cresol, anisole, 4-methylanisole, catechol, guaiacol, 4-methylguaiacol, 1,3-dimethoxybenzene, syringol, and vanillin. Other derived compounds include methanol, methoxyphenol, methyl phenol, dimethyl phenol, ethyl phenol, methyl ethyl phenol, methoxypropylphenol, benzene diol, propyl phenol, and similar compounds. The bottom fraction being gasified can further comprise oligomeric derivatives of carbohydrates, and intermediates, including phenolic intermediates derived from lignin, unreacted or partially hydrolyzed cellulose and hemicellulose, cellulose condensation products, caramelans, and cross polymerization products of sugars and phenolic intermediates. In another embodiment, a second bottom fraction is subject to gasification, where the second bottom fraction comprises a $C_{14}$ or greater hydrocarbon, including an olefin, a paraffin, an aromatic, or a cycloalkane. A particular hydrocatalytic reaction comprises contacting a biomass feedstock with hydrogen in the presence of a metal catalyst capable of activating molecular hydrogen to form a hydrocatalytically treated mixture. In certain embodiments, the hydrocatalytically treated mixture comprises a plurality of hydrocarbon, including oxygenated hydrocarbon molecules, which can be suitable for use in transportation fuels and industrial chemicals. As mentioned, in a preferred embodiment, the fraction of the hydrocatalytically treated mixture that is subject to gasification comprises at least one of heavy end components, including caramelans, lignin and lignin-derived compounds, and cross polymerization products of sugars and lignin components. In one embodiment, the bottom fraction of the hydrocatalytically treated mixture has a separation point having a temperature in a range of about 100 to 600 degrees C. and a pressure about atmospheric pressure, more preferably a temperature in a range of about 100 to 500 degrees C. and a pressure in a range of about 1 to 100 Torr, preferably about 3 to 20 Torr; most preferably a temperature in a range of about 200 to 450 degrees C. and a pressure of about 1 to 100 Torr, preferably about 3 to 20 Torr. As used herein, a "separation point" refers to a temperature and pressure at or above which a component does not become a vapor or gas. For example, components in a bottom fraction of the hydrocatalytically treated mixture having a separation point having a temperature in a range of about 100 to 600 degrees C. and a pressure of about atmospheric pressure means those components do not become a vapor or gas, e.g., vaporize, at or above about 100 to 600 degrees C. and a pressure of about atmospheric pressure. In another preferred embodiment, the portion being gasified further comprises a second bottom portion comprising $C_{14}$ or greater hydrocarbons having a separation point having a temperature in a range of about 100 to 500 degrees C., more preferably a temperature in a range of about 150 to 400 degrees C., and most preferably in a range of about 200 to 400 degrees C., and a pressure in a range of about 0.10 to 7 bar. It is understood that components or compounds in a bottom fraction of the hydrocatalytically treated mixture may degrade or convert into different compounds at a separation point. An advantage of embodiments of the invention may include reducing the carbon footprint of the fuels formed from the thermocatalytic reaction because at least a portion of the hydrogen used in the thermocatalytic reaction has low carbon footprint. A fuel with low carbon footprint can qualify for certain governmental status that provides certain benefits. While particular embodiments provide certain advantages or benefits, they are not required as part of the invention.

As used herein, the term "hydrocarbons" refers to compounds containing both carbon and hydrogen without reference to other elements that may be present. Thus, heteroatom-substituted compounds are also described herein by the term "hydrocarbons." The term "hydrocatalytic treatment" refers to a type of thermocatalytic reaction where the reaction is with hydrogen in the presence of a catalyst capable of activating molecular hydrogen, preferably a metal catalyst.

Various exemplary embodiments of the invention are further described with reference to the drawings. When like elements are used in one or more figures, identical reference characters will be used in each figure, and a detailed description of the element will be provided only at its first occurrence. Some features of the embodiments may be omitted in certain depicted configurations in the interest of clarity. Moreover, certain features such as, but not limited to, pumps, valves, gas bleeds, gas inlets, fluid inlets, fluid outlets and the like have not necessarily been depicted in the figures, but their presence and function will be understood by one having ordinary skill in the art.

Referring to FIG. 1, biomass feedstock 11 is provided to hydrocatalytic treatment system 12 where biomass feedstock 11 is reacted with hydrogen in the presence of a metal catalyst capable of activating molecular hydrogen to produce hydrocatalytically treated mixture 13. Hydrocatalytic treatment system 12 is coupled to separation zone 14 to provide hydrocatalytically treated mixture 13 to separation zone 14. In a preferred embodiment, hydrocatalytic treatment system 12 is in fluid communication with separation zone 14. As shown, at least a portion of hydrocatalytically treated mixture 13 is separated or fractionated into at least two fractions in separation zone 14: overhead fraction 15 and bottom fraction 16. In a preferred embodiment, overhead fraction 15 comprises compounds having a vaporization point that is lower than that of bottom fraction 16, and bottom fraction 16 comprises compounds having a separation point having a temperature in a range of about 100 to 600 degrees C. and pressure of about atmospheric pressure, more preferably a temperature in a range of about 100 to 500 degrees C. and a pressure in a range of about 1 to 100 Torr, preferably about 3 to 20 Torr; most preferably a temperature in a range of about 200 to 450 degrees C. and a pressure in a range of about 1 to 100 Torr, preferably about 3 to 20 Torr. That is, overhead fraction 15 comprises compounds that would vaporize at a temperature in a range about 100 to 600 degrees C. and pressure of about atmospheric pressure, more preferably a temperature in a range of about 100 to 500 degrees C. and about 1 to 100 Torr, preferably about 3 to 20 Torr; most preferably a temperature in a range of about 200 to 450 degrees C. and about 1 to 100 Torr, preferably about 3 to 20 Torr. Compounds in overhead fraction 15 can be referred to as light components while compounds in bottom fraction 16 can be referred to as heavy components.

Referring to FIG. 1, at least a portion of bottom fraction 16 is provided to gasification system 17 for partial oxidation.

In one embodiment, oxidant stream 18 provides gasification system 17 with an oxidant suitable to gasify a carbonaceous material. As used herein, the term "oxidant" includes any oxygen containing compound capable of contributing to the gasification of at least a portion of a carbonaceous material, such as bottom fraction 16. Illustrative oxidants can include, but are not limited to, air, oxygen, essentially oxygen, oxygen-enriched air, mixtures of oxygen and air, mixtures of air and/or oxygen with steam, mixtures of oxygen and one or more inert gases, for example, nitrogen and/or argon, or any combination thereof. Oxidant stream 18 can contain about 20 vol % oxygen or more, about 30 vol % oxygen or more, about 40 vol % oxygen or more, about 50 vol % oxygen or more, about 60 vol % oxygen or more, about 65 vol % oxygen or more, about 70 vol % oxygen or more, about 75 vol % oxygen or more, about 80 vol % oxygen or more, about 85 vol % oxygen or more, about 90 vol % oxygen or more, about 95 vol % oxygen or more, or about 99 vol % oxygen or more. As used herein, the term "essentially oxygen" refers to an oxygen stream containing more than 50 vol % oxygen. As used herein, the term "oxygen-enriched air" refers to a gas mixture containing oxygen in a range of about 21 to 50 vol % oxygen. In one embodiment, oxygen enriched air or essentially oxygen can be supplied by one or more air separation units ("ASU") or a pressure swing absorber. The ASU can provide a nitrogen-lean and oxygen-rich stream for oxidant stream 18, thereby minimizing the nitrogen concentration in the system. The ASU can be a high-pressure, cryogenic type separator that can be supplemented with air. In one embodiment, up to about 50 vol %, or up to about 40 vol %, or up to about 30 vol %, or up to about 20 vol %, or up to about 10 vol % of the total oxidant fed to the gasifier can be supplied by the ASU. In a preferred embodiment, a moderator gas (not shown) can be supplied to gasification system 17, separately or with oxidant stream 18, to control the temperature of gasification system 17. Non-limiting examples of suitable moderator gases include steam, carbon dioxide, or a combination thereof. Conditions for applying oxidant stream 18 and the moderator gas, if used, are known to those skilled in the art.

In another embodiment, oxidant stream 18 can also include steam and/or natural gas, which can be delivered to gasification system 17 separately or with the oxidant in stream 18. The partial oxidation of bottom fraction 16 produces gas mixture 19 comprising hydrogen and carbon monoxide. Gas mixture 19 can be referred to as synthesis gas or syngas. As shown, gasification system 17 is coupled to water-gas shift reaction zone, WGS zone 20, to provide gas mixture 19 to WGS zone 20. As can be seen, WGS zone 20 is external to hydrocatalytic treatment system 12. In one embodiment, gasification system 17 is preferably in fluid communication with WGS zone 20. At least a portion of gas mixture 19 is subject to a water gas shift reaction in WGS zone 20, which converts the carbon monoxide from gas mixture 19 to hydrogen rich shifted synthesis gas product comprising hydrogen and carbon dioxide, which is shown as stream 21. WGS zone 20 is coupled to hydrocatalytic treatment system 12 to provide stream 21 to hydrocatalytic treatment system 12. In one embodiment, WGS zone 20 is preferably in fluid communication with hydrocatalytic treatment system 12. As shown, at least a portion of the hydrogen rich synthesis gas product generated in WGS zone 20 is routed to hydrocatalytic treatment system 12 via stream 21 for use in a hydrocatalytic reaction.

Figure 2:
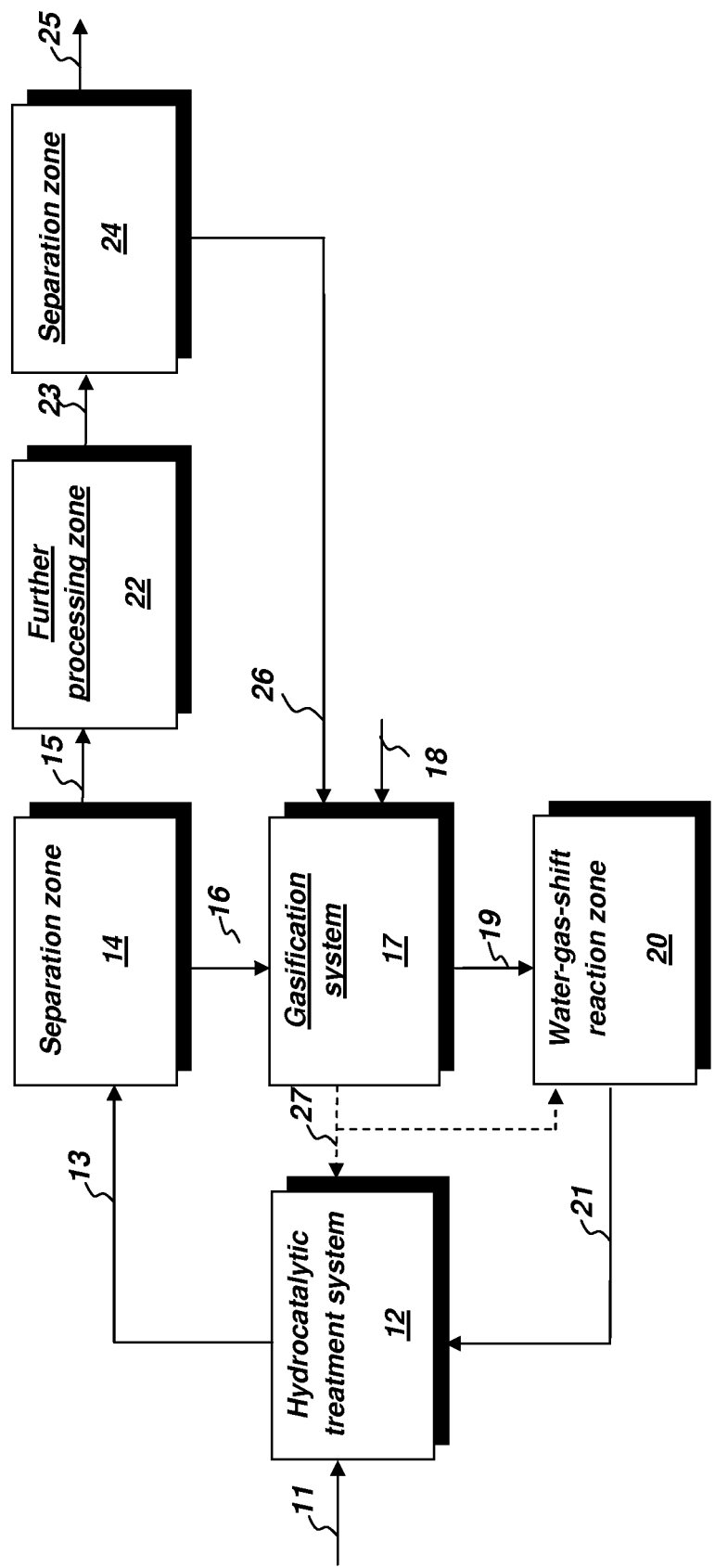
FIG. 2 shows an illustrative schematic of another embodiment to supply hydrogen to a hydrocatalytic reaction through gasification of a fraction of a product stream of the hydrocatalytic reaction according to aspects of the invention.

In a preferred embodiment, the hydrogen contained in stream 21 is provided to hydrocatalytic treatment system 12 at a pressure in a range of about 10-200 bar, more preferably about 20 to 100 bar, most preferably 30 to 80 bar, and a temperature in a range of 35-450 degrees C., more preferably about 50 to 250 degrees C., and most preferably about 100 to 200 degrees C. In some embodiments, steam generated in gasification system 17 can be routed to other processes for use in any suitable manner known to those skilled in the art, such as a heating medium. For example, in one embodiment, gasification system 17 is coupled to hydrocatalytic treatment system 12 to provide hydrocatalytic treatment system 12 with steam generated in gasification system 17 via stream 27 as shown in FIGS. 1 and 2. In a preferred embodiment, the steam contained in stream 27 is provided to hydrocatalytic treatment system 12 at a pressure in a range of about 20-120 bar, more preferably about 40 to 100 bar, most preferably 40 to 90 bar. The steam can be saturated or with superheat. In one embodiment, steam from another source can be provided to hydrocatalytic treatment system 12. In such an embodiment, stream 27 can be combined with steam from the boiler and the mixture of both can be provided as one stream or steam from the boiler and steam from gasification system 17 can be provided separately. In addition or alternatively, steam from gasification system 17 can be routed to WGS zone 20 via stream 27 as shown in FIGS. 1 and 2 to facilitate additional hydrogen generation.

FIG. 2 comprises similar processes and systems and FIG. 1, and further includes separation zone 14 coupled to processing zone 22 to provide processing zone 22 with overhead fraction 15. In one embodiment, separation zone 14 is preferably in fluid communication with processing zone 22. In another embodiment, at least a portion of overhead fraction 15 is subject to one or more reactions in processing zone 22 to produce product stream 23 comprising higher molecular weight compounds. Processing zone 22 is coupled to separation zone 24. In one embodiment, processing zone 22 is preferably in fluid communication with separation zone 24. In another embodiment, product stream 23 is further separated or fractionated into at least two fractions in separation zone 24: overhead fraction 25 and bottom fraction 26. In a preferred embodiment, a first fraction exiting separation zone 24 is overhead fraction 25 comprising compounds having a vaporization point that is below the vaporization point of bottom fraction 26. A second fraction exiting separation zone 24 is preferably bottom fraction 26 comprising compounds having a separation point having a temperature in a range of about 100 to 500 degrees C., more preferably a temperature in a range of about 150 to 400 degrees C., and most preferably in a range of about 200 to 400 degrees C., and a pressure in a range of about 0.10 to 7 bar. That is, overhead fraction 25 comprises compounds that would vaporize at a temperature in a range about 100 to 500 degrees C., more preferably a temperature in a range of about 150 to 400 degrees C., and most preferably in a range of about 200 to 400 degrees C., and a pressure in a range of about 0.10 to 7 bar. In one embodiment, bottom fraction 26 comprises a $C_{14}$ or greater hydrocarbon, such as an olefin, a paraffin, an aromatic, a cycloalkane, caramels, and/or other oxygenate condensation products. Separation zone 24 is coupled to gasification system 17. In one embodiment, separation zone 24 is preferably in fluid communication with gasification system 17. In addition to or alternatively to bottom fraction 16, in one embodiment, at least a fraction of bottom fraction 26 is provided to gasification system 17 also for partial oxidation, generating syngas in gas mixture 19 that can be converted to hydrogen in WGS zone 20 for further use in a hydrocatalytic reaction in hydrocatalytic treatment system 12.

Referring to FIGS. 1-2, in practice of one embodiment, biomass feedstock 11 is introduced to hydrocatalytic treatment system 12 along with a predetermined amount of hydrogen or hydrogen containing gas, preferably from stream 21. Additional hydrogen from an external source can also be provided to hydrocatalytic treatment system 12 as needed, for example, during start up when gasification system 17 may not yet generate a sufficient amount of hydrogen. In such circumstance, in one embodiment, natural gas can also be provided to gasification system 17. Biomass feedstock 11 reacts with hydrogen in the presence of a metal catalyst capable of activating molecular hydrogen to form hydrocatalytically treated mixture 13, at least a portion of which is discharged and passed to separation zone 14 where mixture 13 is separated into overhead fraction 15 and bottom fraction 16 comprising lignin and lignin-derived compounds. Bottom fraction 16 is discharged and provided to gasification system 17 where it is partially oxidized with oxidant provided by stream 18 to generate gas mixture 19 comprising hydrogen and carbon monoxide, or synthesis gas. Gas mixture 19 is discharged and introduced to WGS zone 20 to generate stream 21 comprising a hydrogen rich shifted synthesis gas product. Stream 21 is discharged and routed to hydrocatalytic treatment system 12 for use in a hydrocatalytic reaction. In an alternative embodiment (not shown), a portion of overhead fraction 15 can also be routed to gasification system 17.

Referring to FIG. 2, in one embodiment, at least a portion of overhead fraction 15 is discharged and passed to processing zone 22 to produce product stream 23 comprising higher molecular weight compounds. Product stream 23 is discharged and passed to separation zone 24 to separate product stream 23 into overhead fraction 25 and bottom fraction 26, which can be discharged and routed to gasification system 17 for partial oxidation to additionally generate gas mixture 19.

Any suitable type of biomass can be used as biomass feedstock 11. Suitable cellulosic biomass sources may include, for example, forestry residues, agricultural residues, herbaceous material, municipal solid wastes, waste and recycled paper, pulp and paper mill residues, and any combination thereof. Thus, in some embodiments, a suitable cellulosic biomass may include, for example, corn stover, straw, bagasse, miscanthus, sorghum residue, switch grass, bamboo, water hyacinth, hardwood, hardwood chips, hardwood pulp, softwood, softwood chips, softwood pulp, duckweed, and any combination thereof. Leaves, roots, seeds, stalks, husks, and the like may be used as a source of the cellulosic biomass. Common sources of cellulosic biomass may include, for example, agricultural wastes (e.g., corn stalks, straw, seed hulls, sugarcane leavings, nut shells, and the like), wood materials (e.g., wood or bark, sawdust, timber slash, mill scrap, and the like), municipal waste (e.g., waste paper, yard clippings or debris, and the like), and energy crops (e.g., poplars, willows, switch grass, alfalfa, prairie bluestream, corn, soybeans, and the like). The cellulosic biomass may be chosen based upon considerations such as, for example, cellulose and/or hemicellulose content, lignin content, growing time/season, growing location/transportation cost, growing costs, harvesting costs, and the like.

Biomass feedstock 11 may be natively present in any sizes, shapes, or forms, or it may be further processed prior to entering hydrocatalytic treatment in system 12. Examples of further processing include washing (such as, with water, an acid, a base, combinations thereof, and the like), torrefaction, liquefaction, such as pyrolysis, or reduction in size. In some embodiments, the reduction in size may include chopping, grounding, shredding, pulverizing, and the like to produce a desired size. Thus, in some embodiments, providing a biomass material can comprise harvesting a lignocelluloses-containing plant such as, for example, a hardwood or softwood tree. The tree can be subjected to debarking, chopping to wood chips of desirable thickness, and washing to remove any residual soil, dirt and the like.

Biomass feedstock 11 is preferably treated to convert the cellulose and other complex carbohydrates into a more usable form, which can be further transformed into compounds with one or more alcohol functional groups through downstream reactions. While suitable for further transformation, soluble carbohydrates can be very reactive and can rapidly degrade to produce caramelans and other degradation products, especially under higher temperature conditions, such as above about 150° C. One way to protect soluble carbohydrates from thermal degradation is to subject them to one or more catalytic reduction reactions, which may include hydrogenation and/or hydrogenolysis reactions. Depending on the reaction conditions and catalyst used, reaction products formed as a result of conducting one or more catalytic reduction reactions on soluble carbohydrates may comprise, as mentioned, one or more alcohol functional groups, particularly including triols, diols, monohydric alcohols, and any combination thereof, some of which may also include a residual carbonyl functionality (e.g., an aldehyde or a ketone). Such reaction products are typically more thermally stable than soluble carbohydrates and may be readily transformable into fuel blends and other materials through conducting one or more downstream further processing reactions. That is, soluble carbohydrates formed during hydrothermal digestion may be intercepted and converted into more stable compounds before they have an opportunity to significantly degrade, even under thermal conditions that otherwise promote their degradation.

In a preferred embodiment, a hydrocatalytic reaction that takes place in system 12 of FIGS. 1 and 2 is conducted in the presence of hydrogen, specifically molecular hydrogen, with a catalyst that is capable of activating molecular hydrogen to participate in various reactions such as hydrothermal digestion; catalytic reduction reactions, including hydrogenation, hydrogenolysis, and/or hydrodeoxygenation; and optionally hydrodesulfurization and hydrodenitrification. Any suitable hydrocatalytic reaction can take place in system 12. Exemplary hydrocatalytic reactions, including hydrogenation and hydrogenolysis, are described in U.S. Publication Application No. US2011/0154721, the disclosure of which is incorporated herein by reference in its entirety.

For example, in one embodiment, hydrocatalytic treatment system 12 can comprise a reaction as described in US2011/0154721, such as a hydrogenolysis reaction and/or a hydrogenation reaction, where soluble carbohydrate is catalytically reacted with hydrogen to produce desired reaction products. Examples of desired or suitable reactions products may include, but are not limited to, alcohols, polyols, aldehydes, ketones, other oxygenated intermediates, and any combination thereof. For instance, hydrocatalytic treatment system 12 can comprise hydrogenation reaction 104 and/or hydrogenolysis reaction 106 of FIGS. 1-3 of US2011/0154721. The descriptions corresponding to hydrogenation reaction 104 and hydrogenolysis reaction 106 are provided by US2011/0154721, which is incorporated by reference in its entirety, and thus need not be repeated.

Figure 3:
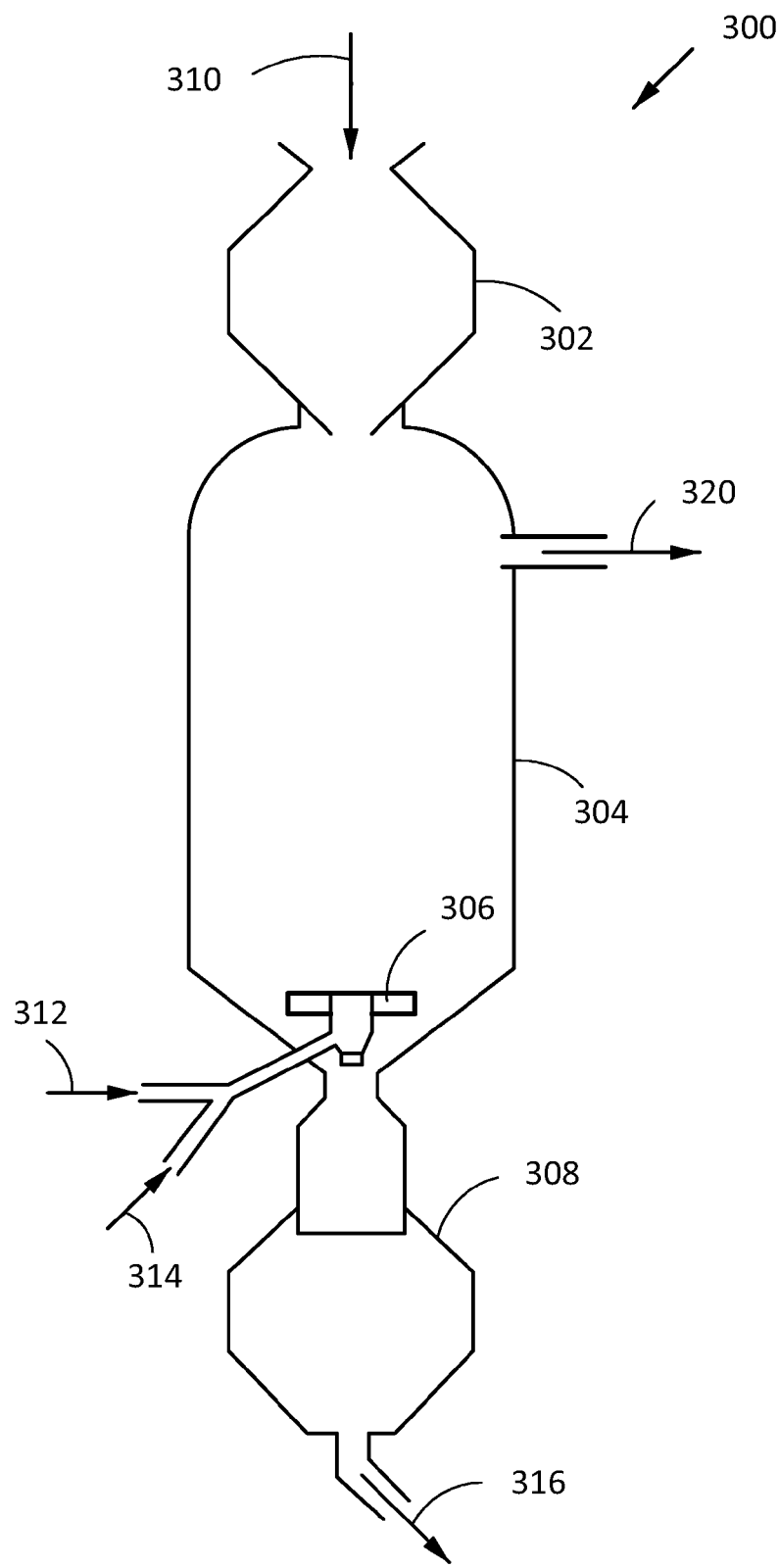
FIG. 3 shows an illustrative schematic of an exemplary moving bed gasifier that can be used in one embodiment according to aspects of the invention.

In such an embodiment, at least a portion of the products exiting hydrogenation reaction 104 and/or hydrogenolysis reaction 106 FIGS. 1-3 of US2011/0154721 can be routed to separation zone 14 shown in FIGS. 1-2, so a bottom fraction 16 can be separated from the products stream as described herein. For instance, in one embodiment, separation zone 14 can comprise separation unit 108 in FIG. 3 of US2011/0154721, which can provide a fraction having a separation point having a temperature in a range of about 100 to 600 degrees C. and a pressure of about atmospheric pressure, more preferably a temperature in a range of about 100 to 500 degrees C. and a pressure in a range of about 1 to 100 Torr, preferably about 3 to 20 Torr; most preferably a temperature in a range of about 200 to 450 degrees C. and a pressure in a range of about 1 to 100 Torr, preferably about 3 to 20 Torr. The fraction can be routed to gasification system 17 of FIGS. 1-2 for partial oxidation to generate gas mixture 19. Additional details of separation zone 14 and gasification system 17 are provided below.

In another embodiment, hydrocatalytic treatment system 12 further comprises a digestion process to convert cellulose and other complex carbohydrates contained in biomass feedstock 11 into a soluble carbohydrate. As used herein, the term "soluble carbohydrates" refers to monosaccharides or polysaccharides that become solubilized in a digestion process. Any suitable digestion process that forms a pretreated biomass containing soluble carbohydrates can be used. Examples of suitable digestion processes can be found in U.S. Application Publication Nos. US2012/0152836, and US2012/0156743, the disclosure of each is incorporated herein by reference in its entirety.

In one embodiment, hydrocatalytic treatment system 12 can comprise a reaction as described in US2012/0152836. For instance, hydrocatalytic treatment system 12 can comprise any combination of hydrogenolysis systems 126, 126A, 126B, and 126C shown in FIGS. 1-5 of US2012/0152836. In another embodiment, hydrocatalytic treatment system 12 can further comprise digestion system 106 shown in FIGS. 1-5 of US2012/0152836. The descriptions corresponding to digestion system 106 and hydrogenolysis systems 126, 126A, 126B, and 126C are provided by US2012/0152836, which is incorporated by reference in its entirety, and thus need not be repeated. In such embodiments, at least a portion of any product stream exiting a hydrogenolysis system, such as stream 122, stream 123, or stream 130, of FIGS. 1-5 of US2012/0152836 can be routed to separation zone 14 shown in FIGS. 1-2, so a bottom fraction 16 can be separated from the products stream and gasified as described herein.

In another embodiment, hydrocatalytic treatment system 12 can comprise a reaction as described in US2012/0156743. For instance, hydrocatalytic treatment system 12 can comprise hydrogenolysis system 120 shown in FIGS. 1-2 of US2012/0156743. In another embodiment, hydrocatalytic treatment system 12 can further comprise pretreat system 104, optionally along with digestive system 190, and/or treatment system 110 of FIGS. 1-2 of US2012/0156743. In such embodiments, at least a portion of oxygenated intermediate stream 122 of FIGS. 1-2 of US2012/0156743 can be routed to separation zone 14 shown in FIGS. 1-2, so a bottom fraction 16 can be separated from the products stream and gasified as described herein.

It is understood that the hydrocatalytic treatment that takes place in hydrocatalytic treatment system 12 can employ aqueous phase and/or organic phase solvents. For example, US2011/0154721, US2012/0152836, and US2012/0156743 provide examples of hydrocatalytic treatment that occurs in aqueous phase. Exemplary descriptions of a hydrocatalytic treatment that takes place in an organic phase can be found in U.S. Application Publication No. US2013/0109896, the disclosure of which is hereby incorporated by reference in its entirety.

In one embodiment, hydrocatalytic treatment system 12 can comprise a reaction as described in US2013/0109896. For example, hydrocatalytic treatment system 12 can comprise organic phase hydrocatalytic treatment system 20 shown in FIG. 1 of US2013/0109896. In another embodiment, hydrocatalytic treatment system 12 can further comprise digestive system 10 shown in FIG. 1 of US2013/0109896. The descriptions corresponding to digestive system 10 and organic phase hydrocatalytic treatment system 20 are provided by US2013/0109896, which is incorporated by reference in its entirety, and thus need not be repeated. In such embodiments, at least a portion of organic hydrocarbon-rich phase stream 32 shown in FIG. 1 of US2013/0109896 can be routed to separation zone 14 shown in FIGS. 1-2, so a bottom fraction 16 can be separated from the organic hydrocarbon-rich phase stream 32 and gasified as described. In one embodiment, the liquid-liquid separation 30 in FIG. 1 of US2013/0109896 can be part of separation zone 14. That is, separation zone 14 can comprise the liquid-liquid separation 30 in FIG. 1 of US2013/0109896. For example, in one embodiment, separation zone 14 comprises a liquid-liquid separation step, such as that described in US2013/0109896, which provides bottom fraction 16 that can be routed to gasification system 17. In addition to or as an alternative, in one embodiment, the liquid-liquid separation step provides an organic hydrocarbon-rich phase that is further separated in separation zone 14 to provide bottom fraction 16.

In yet another embodiment, if a digestion process is employed, the digestion process preferably comprises hydrothermal digestion, particularly as described in U.S. Application Publication Nos. 61/665,641, filed on Jun. 28, 2012, 61/720,757, filed on Oct. 31, 2012, and 61/817,996, filed on May 1, 2013, the disclosures of which are hereby incorporated by reference in their entirety. Hydrothermal digestion of biomass feedstock 11 is preferably conducted in the presence of molecular hydrogen and a slurry catalyst capable of activating the molecular hydrogen. In such particular embodiments, the hydrothermal digestion of cellulosic biomass and the catalytic reduction of soluble carbohydrates produced therefrom preferably take place in the same vessel, which can be referred to as "in situ catalytic reduction reaction processes." As used herein, the term "slurry catalyst" will refer to a catalyst comprising fluidly mobile catalyst particles that can be at least partially suspended in a fluid phase via gas flow, liquid flow, mechanical agitation, or any combination thereof.

In one embodiment, hydrocatalytic treatment system 12 can comprise a reaction as described in U.S. Application No. 61/665,641. For example, hydrocatalytic treatment system 12 can comprise at least one of hydrothermal digestion unit 2 and catalytic reduction reactor unit 4 shown in FIG. 1 of U.S. Application No. 61/665,641. In another embodiment, hydrocatalytic treatment system 12 can further comprise solids separation mechanism 24 also shown in FIG. 1 of U.S. Application No. 61/665,641. Solids separation mechanism 24 can comprise any suitable mechanism that can remove at least a solid contained in a product stream exiting catalytic reduction reactor unit 4, such as reaction product takeoff line 18 shown in FIG. 1 of U.S. application Ser. No. 61/665,641. Non-limiting examples of suitable solids separation mechanisms may include, for example, any number and combination of filters, hydroclones, centrifuges, membranes, and settling tanks. The descriptions corresponding to hydrothermal digestion unit 2, catalytic reduction reactor unit 4, and solids separation mechanism 24 are provided by U.S. Application No. 61/665,641, which is incorporated by reference in its entirety, and thus need not be repeated. In such embodiments, at least a portion of reaction product takeoff line 18 shown in FIG. 1 of U.S. Application No. 61/665,641, whether having passed through solids separation mechanism 24, can be routed to separation zone 14 shown in FIGS. 1-2, so a bottom fraction 16 can be separated and gasified as described. In one embodiment, phase separation mechanism 26 in FIG. 1 of U.S. application Ser. No. 61/665,641 can be part of separation zone 14. That is, separation zone 14 can comprise phase separation mechanism 26 in FIG. 1 of U.S. Application No. 61/665,641 that provides bottom fraction 16 which can be routed to gasification system 17. In addition to or alternatively, in one embodiment, phase separation mechanism 26 in FIG. 1 of U.S. Application No. 61/665,641 provides an organic phase that is further separated in separation zone 14 to provide bottom fraction 16.

In another embodiment, hydrocatalytic treatment system 12 can comprise a reaction as described in U.S. Application No. 61/720,757. For example, hydrocatalytic treatment system 12 can comprise at least one of hydrothermal digestion unit 2 and polishing reactor 16 shown in FIG. 1 of U.S. Application No. 61/720,757. If employed, polishing reactor 16 shown in FIG. 1 of U.S. Application No. 61/720,757 is where one or more catalytic reduction reactions can further take place to protect soluble carbohydrates from thermal degradation as described. The descriptions corresponding to hydrothermal digestion unit 2 and polishing reactor 16 are provided by U.S. Application No. 61/720,757, which is incorporated by reference in its entirety, and thus need not be repeated. In such embodiments, at least a portion of lignin removal line 18 shown in FIG. 1 of U.S. Application No. 61/720,757 can be routed to separation zone 14 shown in FIGS. 1-2, so a bottom fraction 16 can be separated and gasified as described. In addition to or alternatively, in embodiments comprising polishing reactor 16 shown in FIG. 1 of U.S. Application No. 61/720,757, at least a portion of the product stream exiting polishing reactor 16 can be routed to separation zone 14 shown in FIGS. 1-2, so a bottom fraction 16 can be separated and gasified as described. That is, the input to separation zone 14 can include a product from hydrothermal digestion unit 2 and/or polishing reactor 16 of U.S. Application No. 61/720,757.

In yet another embodiment, hydrocatalytic treatment system 12 can comprise a reaction as described in U.S. Application No. 61/817,996. For example, hydrocatalytic treatment system 12 can comprise at least one of hydrothermal digestion unit 2 and polishing reactor 16 shown in FIGS. 1-12 of U.S. Application No. 61/817,996. If employed, polishing reactor 16 shown in FIGS. 1-12 of U.S. Application No. 61/817,996 is where one or more catalytic reduction reactions can further take place to protect soluble carbohydrates from thermal degradation as described. The descriptions corresponding to hydrothermal digestion unit 2 and polishing reactor 16 are provided by U.S. application Ser. No. 61/817,996, which is incorporated by reference in its entirety, and thus need not be repeated. In such embodiments, at least a portion of lignin removal line 18 shown in FIGS. 1-12 of U.S. Application No. 61/817,996 can be routed to separation zone 14 shown in FIGS. 1-2, so a bottom fraction 16 can be separated and gasified as described. In addition to or alternatively, in embodiments comprising polishing reactor 16 shown in FIGS. 1-12 of U.S. Application No. 61/817,996, at least a portion of the product stream exiting polishing reactor 16 can be routed to separation zone 14 shown in FIGS. 1-2, so a bottom fraction 16 can be separated and gasified as described. That is, the input to separation zone 14 can include a product from hydrothermal digestion unit 2 and polishing reactor 16 of U.S. Application No. 61/817,996. In one embodiment, separations unit 32 in FIGS. 1-12 of U.S. Application No. 61/817,996 can be part of separation zone 14. That is, separation zone 14 can comprise separations unit 32 in FIGS. 1-12 of U.S. Application No. 61/817,996 that provides bottom fraction 16 which can be routed to gasification system 17.

Referring to FIGS. 1-2, at least a portion of hydrocatalytically treated mixture 13 formed in hydrocatalytic treatment system 12 is routed to separation zone 14 where mixture 13 can be separated into different components that can be further processed accordingly. In a preferred embodiment, at least a portion of hydrocatalytically treated mixture 13 is separated into at least two fractions in separation zone 14: overhead fraction 15 and bottom fraction 16. In one embodiment, separation zone 14 can comprise a phase separator, a stripping column, an extractor, a filter, a distillation column, a flasher, or any combination thereof.

In a preferred embodiment, separation zone 14 separates hydrocatalytically treated mixture 13 into various components based on the volatility property (separation point) of the compounds in mixture 13 under various temperature and pressure conditions. For example, a temperature in a range of about 100 to 600 degrees C. and a pressure of about atmospheric pressure, more preferably a temperature in a range of about 100 to 500 degrees C. and a pressure in a range of about 1 to 100 Torr, preferably about 3 to 20 Torr; most preferably a temperature in a range of about 200 to 450 degrees C. and a pressure in a range of about 1 to 100 Torr, preferably about 3 to 20 Torr, can be applied to at least a portion of hydrocatalytically treated mixture 13. Referring to FIGS. 1-2, in one embodiment, compounds that vaporize under these conditions become overhead fraction 15, which can be collected for further processing, and compounds that do not vaporize remain to form bottom fraction 16. The temperature and pressure can be applied gradually in a continuous or step-wise manner or rapidly as desired or according to operating conditions using suitable techniques known to those skilled in the art, such as those employed in distillation columns. The temperature and pressure can be applied for any suitable duration. Such manners of applying temperature and pressure to separate components based on vaporization properties are known to those skilled in the art. Examples of a suitable time period include about 1-60 minutes. Bottom fraction 16 preferably comprises lignin and/or lignin-derived compounds, such as partially depolymerized lignin moieties containing 5-'5, phenylcoumaran, and β-O-4 linkages as characterized by monomeric compounds phenol, o-cresol, p-cresol, anisole, 4-methylanisole, catechol, guaiacol, 4-methylguaiacol, 1,3-dimethoxybenzene, syringol, and vanillin. Other derived compounds include methanol, methoxyphenol, methyl phenol, dimethyl phenol, ethyl phenol, methyl ethyl phenol, methoxypropylphenol, benzene diol, propyl phenol, and similar compounds. In a preferred embodiment, bottom fraction 16 is a solid at ambient temperature and can flow at higher temperatures, such as greater than 100 degrees C. The viscosity of bottom fraction 16 preferably decreases with increasing temperature. In one embodiment, the viscosity of bottom fraction 16 at a temperature of about 75 degrees C. is preferably about 1 to 10,000 centipoise (cP), more preferably about 100 to 5,000 cP, most preferably about 500 to 1000 cP. As will be understood by those of ordinary skill in the art, the viscosity and therefore the pumpability of bottom fraction 16 from separation zone 14 and/or bottom fraction 26 from separation zone 24 can be affected by various factors, including temperature, pressure, concentration of various compounds in the particular bottom fraction, composition, diluents, if any are used, impurity levels, storage time. If the physical state of bottom fraction 16 and/or bottom fraction 26 is solid to viscous, or a semi-solid liquid, it can be heated to a temperature and/or the pressure suitable to render it sufficiently fluid to be pumped, as desired.

Overhead fraction 15 is preferably subject to further processing to produce a higher molecular weight compound. In one embodiment, the further processing takes place in processing zone 22 shown in FIG. 2. Non-limiting exemplary further processing methods include (i) reforming reactor 38 shown in FIGS. 1-12 of U.S. Application No. 61/817,996, (ii) reforming reactor 28 shown in FIG. 1 of U.S. Application No. 61/720,757, (iii) processing system 130 shown in FIGS. 1-2 of US2012/0156743, (iv) processing step 136 shown in FIGS. 1-5 of US2012/0152836; and processing reaction 110 shown in FIGS. 1-3 of US2011/0154721. In general, suitable further processing reactions include, but are not limited to, hydrogenolysis reactions, hydrogenation reactions, condensation reactions, isomerization reactions, oligomerization reactions, hydrotreating reactions, alkylation reactions, and any combination thereof. For example, referring to FIG. 2, overhead fraction 15 is subject to a condensation reaction in processing zone 22 to produce product stream 23, which is routed to separation zone 24 where product stream 23 can be fractionated into desired components.

The further processing can comprise one or more reactions that may be catalytic or non-catalytic. It is to be understood that any number of reactors may be employed to carry out the further processing, such as that in processing zone 22. In some embodiments, a first further processing reaction may comprise a condensation reaction. Additional further processing reactions may comprise any combination of further catalytic reduction reactions (e.g., hydrogenation reactions, hydrogenolysis reactions, hydrotreating reactions, and the like), further condensation reactions, isomerization reactions, desulfurization reactions, dehydration reactions, oligomerization reactions, alkylation reactions, and the like. Such reactions may be used to convert the initially produced soluble carbohydrates into a biofuel, including, for example, gasoline hydrocarbons, diesel fuels, jet fuels, and the like. As used herein, the term "gasoline hydrocarbons" refers to substances comprising predominantly $C_5$-$C_9$ hydrocarbons and having a boiling point of about 32 to 204 degrees C. More generally, any fuel blend meeting the requirements of ASTM D2887 may be classified as a gasoline hydrocarbon. Suitable gasoline hydrocarbons may include, for example, straight run gasoline, naphtha, fluidized or thermally catalytically cracked gasoline, VB gasoline, and coker gasoline. As used herein, the term "diesel fuel" refers to substances comprising paraffinic hydrocarbons and having a boiling point in a range of about 187 to 417 degrees C., which is suitable for use in a compression ignition engine. More generally, any fuel blend meeting the requirements of ASTM D975 may also be defined as a diesel fuel. As used herein, the term "jet fuel" refers to substances meeting the requirements of ASTM D1655. In some embodiments, jet fuels may comprise a kerosene-type fuel having substantially $C_8$-$C_{16}$ hydrocarbons (Jet A and Jet A-1 fuels). In other embodiments, jet fuels may comprise a wide-cut or naphtha-type fuel having substantially $C_5$-$C_{15}$ hydrocarbons present therein (Jet B fuels).

In another embodiment, the products of a further processing reaction can be separated further to produce a second overhead fraction and a second bottom fraction which can be gasified in gasification system 17. As shown in FIG. 2, at least a portion of overhead fraction 15 is routed to processing zone 22 to form higher molecular weight compounds, which exit processing zone 22 as product stream 23. In one embodiment, at least a portion of product stream 23 is routed to separation zone 24 for further separation, preferably into at least two fractions: overhead fraction 25 and bottom fraction 26. In a preferred embodiment, a first fraction exiting separation zone 24 is overhead fraction 25 comprising compounds that vaporize at a separation point of bottom fraction 26. A second fraction exiting separation zone 24 is preferably bottom fraction 26 comprising compounds having a separation point having a temperature in a range of about 100 to 500 degrees C., more preferably a temperature in a range of about 150 to 400 degrees C., and most preferably in a range of about 200 to 400 degrees C., and a pressure in a range of about 0.10 to 7 bar. In addition to or alternatively to bottom fraction 16, in one embodiment, at least a fraction of bottom fraction 26 enters gasification system 17 to be partially oxidized and routed to hydrocatalytic treatment system 12 as described in this disclosure. Separation zone 24 preferably functions similar to separation 14 where components can be separated based on their vaporization properties. For instance, overhead fraction 25 and bottom fraction 26 can be generated from application of a temperature in a range of about 100 to 500 degrees C. and a pressure in a range of about 0.10 to 7 bar. Compounds that would vaporize at the applied temperature and pressure can form overhead fraction 25, which can be collected for further processing or other use. Compounds that would not vaporize at the applied temperature and pressure remain to form bottom fraction 26. Bottom fraction 26 preferably comprises $C_{14}$ or greater hydrocarbons, including an olefin, a paraffin, an aromatic, or a cycloalkane.

Referring to FIGS. 1-2, at least one of a portion of bottom fraction 16 and a portion of bottom fraction 26 is routed to gasification system 17 where it serves as a carbonaceous feed. It is understood that the temperature and pressure under which bottom fraction 16 and/or bottom fraction 26 enter gasification system 17 are dependent on the gasifier(s) selected as discussed further below.

In gasification system 17, bottom fraction 16 is partially oxidized to produce gas mixture 19 which comprises hydrogen ($H_2$) and carbon monoxide (CO). Bottom fraction 16 can enter gasification system 17 in any form, such as a dry feed or a wet feed, including a solid, a liquid, or a solid coated with a liquid. The term "liquid" used in context of bottom fraction 16 and/or bottom fraction 26 refers to a carbonaceous feed that is a liquid, an emulsion, or a pumpable slurry at the feed pressure and temperature into gasification system 17. In a preferred embodiment, bottom fraction 16 and/or bottom fraction 26 enters gasification system 17 as a liquid.

Gasification system 17 can comprise any suitable gasification system that can partially oxidize bottom fraction 16 and/or bottom fraction 26 to generate gas mixture 19. For example, in one embodiment, if bottom fraction 16 enters gasification system 17 as a solid, any suitable dry feed gasification system can be used to partially oxidize bottom fraction 16 to produce gas mixture 19. In another embodiment, if bottom fraction 16 and/or bottom fraction 26 enters gasification system 17 as a liquid, any suitable wet feed gasification system can be used to partially oxidize bottom fraction 16 and/or bottom fraction 26 to produce gas mixture 19. Dry feed and wet feed gasification systems are known to those of ordinary skill in the art.

The gasification process is well known in the art and can be employed using solid and liquid carbonaceous sources. The gasification process uses partial oxidation or incomplete combustion to convert carbonaceous materials at high temperature into synthesis gas ("syngas"), which comprises carbon monoxide and hydrogen. This is in contrast to a full combustion or complete oxidation reaction where primarily steam and carbon dioxide are produced by the reaction of a fuel, such as a carbonaceous material, and an oxidant, such as oxygen. A complete oxidation typically take place under conditions that have excess oxygen according to the following equation:

$$C_nH_m + (n + \tfrac{1}{4}m)O_2 \rightarrow \tfrac{1}{2}mH_2O + nCO_2 \qquad \text{Equation (1)}$$

For gasification processes, oxygen is restricted to less than a stoichiometric concentration of oxygen relative to fuel where process generates primarily hydrogen and carbon monoxide through incomplete combustion or partial oxidation of the fuel, as represented by the equation below:

$$C_nH_m + \tfrac{1}{2}nO_2 \rightarrow \tfrac{1}{2}mH_2 + nCO \qquad \text{Equation (2)}$$

The operating conditions, including temperature, vary with the gasifier and feed type as described further below. Gasification system 17 can comprise a single gasifier, which can also be referred to as gasification reactor vessel, or two or more gasifiers of differ rent or the same type arranged in series and/or parallel. One or more oxidants and one or more feed, i.e., bottom fraction 16 and/or bottom fraction 26 can be directed, fed, or otherwise introduced to one or more particular gasifier of gasification system 17. The one or more oxidants and one or more feed can be introduced to gasification system 17 continuously, intermittently, interspersingly, simultaneously, separately, sequentially, or a combination thereof. Any number of oxidants can be directed, fed, or otherwise introduced to gasification system 17. For example, the number of oxidants introduced to gasification system 17 can be 1, 2, 3, 4, 5, 6, 7, 8, 9, 10, or more. It is understood that conditions for partial oxidation or incomplete combustions may be provided at least by limiting the amount of oxygen available in gasification system 17 to less than what is required for full oxidation or combustion. For example, this can be done by controlling the amount of oxidant stream 18 entering gasification system 17 and/or by the amount of oxygen in oxidant stream 18 itself.

Various types of gasifiers can be utilized as discussed and described herein. In general, the gasifier types can be grouped into three principal categories: moving-bed gasifiers, fluid-bed gasifiers, and entrained-flow gasifiers. Each of the three types can be used with solid carbonaceous material. The entrained-flow gasifier can particularly process liquid carbonaceous material efficiently. Exemplary commercial gasification providers include GE Energy, Conoco Philips E-Gas, Shell, Siemens, KBR Transport, and British Gas Lurgi (BGL). For example, gasification system 17 can entail one or more circulating solids or transport gasifiers, one or more fixed bed gasifiers, one or more fluidized bed gasifiers, one or more entrained flow gasifiers, or a combination thereof. An exemplary gasifier suitable for use according to one or more embodiments discussed and described herein, particularly when bottom fraction 16 and/or bottom fraction 26 enter gasification system 17 as a liquid, can be a gasifier configured according to the Shell Gasification Process (SGP) as known to those skilled in the art.

In general, moving-bed gasifiers, which can also be called fixed-bed gasifiers in certain instances, have a bed on which the dry or solid feed moves downward under gravity as it is gasified by flow of oxidant to generate synthesis gas. In one embodiment, the oxidant flow is counter-current to the movement of the feed. In such an embodiment, the hot synthesis gas generated is preferably used to preheat and pyrolyse the downward flowing coal. In one embodiment, the size of feed entering a moving-bed gasifier, if one is used, is in a range of about 6 to 50 mm. In another embodiment, the outlet gas temperature of a moving-bed gasifier is in a range of about 425 to 650 degrees C.

FIG. 3 provides one non-limiting exemplary embodiment of a moving-bed or fixed-bed gasifier with reference numeral 300, such as a Sasol-Lurgi gasifer. Gasifier 300 includes feed lock 302, reactor vessel 304, grate 306, and ash lock 308. In operation of one embodiment, a sized solid feed 310 comprising bottom fraction 16 and/or bottom fraction 26, with particles preferably greater than about 4 mm, preferably in a range of about 6 to 50 mm, enters reactor vessel 304 through feed lock 302 and moves down through a bed formed inside reactor vessel 304. Oxygen stream 312 and steam 314 enter at a bottom of the bed, through grate 306. In a preferred embodiment, oxygen stream 312 and steam 314 corresponds to oxidant stream 18 of FIGS. 1 and 2. In the embodiment shown, oxygen stream 312 and steam 314 combine with each other before entering reactor vessel 304. In one embodiment, gasifier 300 can be a pressurized gasifier, where oxygen stream 312 and steam 314 have a pressure of about 20 bar or more.

In one embodiment, reactor vessel 304 has different reaction zones distinguishable from top to bottom, starting with a drying zone where moisture is released, below which is a devolatization zone where pyrolysis takes place, below which is a reduction zone or gasification zone where mainly endothermic reactions occur, below which is an exothermic oxidation or combustion zone, and an ash bed at the bottom of reactor vessel 304. It is understood that the transition from one zone to the next is gradual. As shown in FIG. 3, gasifier 300 is operated in a counter-current mode where oxygen stream 312, steam 314, and syngas flow upwards counter-current to the movement of feed 310. In such an embodiment, higher temperature ash exchanges heat with lower temperature incoming reagents, such as oxygen stream 312, steam 314, or air, while at the same time higher temperature synthesis gas exchanges heat with lower temperature incoming feed 310. As shown in FIG. 3, synthesis gas stream 320 exits gasifier 300 near a top of reactor vessel 304. Ash generated in reactor vessel 304 passes through grate 306 and the ash lock 308 before it exits gasifier 300 as ash stream 316.

In one embodiment, the temperature profile in gasifier 300 can vary between about 800 and 1200 degrees C., such as at least 1000 degrees C., as feed 310 moves through the different zones in reactor vessel 304. In another embodiment, the temperature profile in gasifier 300 can be up to about 1700 degrees C. In one embodiment, synthesis gas stream 30 leaves gasifier 300 at a temperature in the range of 375 to 650 degrees C. It is understood by one of ordinary skill in the art that it is typically difficult for a moving-bed or fixed-bed gasifier, such as gasifier 300, to handle high melting ash. In one embodiment, the operating conditions can be adjusted accordingly.

With respect to the second type of gasifier, fluid-bed gasifiers, in general, provide conditions that promote mixing between feed and oxidant, thereby ensuring an even distribution of material in the bed. Fluid-bed gasifier technology is generally based on the velocity of the flow of gas (oxidant and syngas) through the reactor. The lower range of gas velocity includes a stationary or bubbling fluid bed reactor where the gas velocity is low enough to provide a distinction between the dense phase or bed and the freeboard where the solid particles from the feed disengage from the flow of gas. As the gas velocity increases, the higher range of gas velocity includes a transport reactor where all the solid particles are carried with the gas and full pneumatic transport is achieved. The region between the two ends of the gas velocities spectrum includes a circulating fluid bed reactor where the differential velocity between gas and solids reaches a maximum at intermediate gas velocities. In general, operation of a fluid-bed gasifier depends on the size of feed, which should be in a range where the particles of feed can be lifted by the flow of gas. In one embodiment, the size of feed entering a fluid-bed gasifier, if one is used, is in a range of about 6 to 10 mm. In another embodiment, the operating temperature of a fluid-bed gasifier is below the softening point of ash, which is typically, in one embodiment, in a range between about 800 to 1100 degrees C. such as about 1000 degrees C. In another embodiment, the operating temperature is up to about 1700 degrees C. In yet another embodiment, the outlet gas temperature of a fluid-bed gasifier is in a range of about 750 to 1050 degrees C. It is understood by one of ordinary skill in the art that it is typically difficult for a fluidized-bed gasifier, such as gasifiers 400, 500, or 600, to handle high melting ash. In one embodiment, the operating conditions can be adjusted accordingly.

Figure 4:
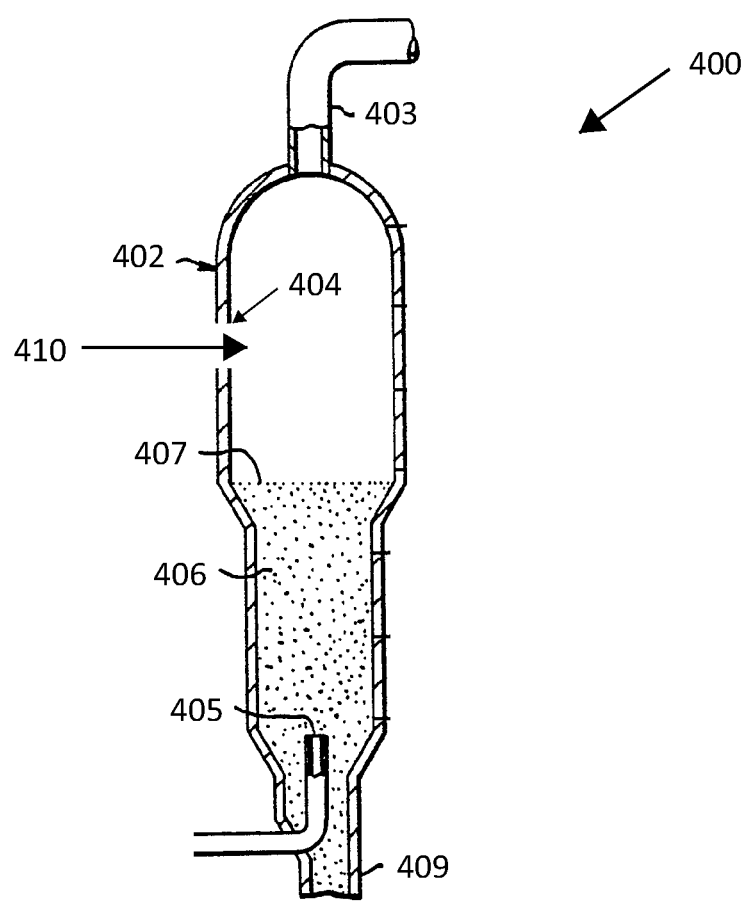
FIG. 4 shows an illustrative schematic of an exemplary stationary fluid-bed gasifier that can be used in one embodiment according to aspects of the invention.

FIG. 4 provides one non-limiting; exemplary embodiment of a bubbling or stationary fluidized bed gasification gasifier with numeral reference 400. As shown, gasifier 400 comprises reactor vessel 402, having product gas outlet 403 disposed at or near its upper portion, feed inlet 404, reagent inlet 405 at or near a lower portion of reactor vessel 402, and fluidized bed 406 having a bed height 407 extending from a bottom of reactor vessel 402 to a position in reactor vessel 402, and ash discharge 409 at or near a bottom of reactor vessel 402.

During operation of gasifier 400, feed material 410 comprising bottom fraction 16 and/or bottom fraction 26 enters reactor vessel 402 through feed inlet 404, which preferably comprises a fluidizing nozzle to produce particles having an appropriate or desired size. In one embodiment, feed particles that enter reactor vessel 402 have a size in a range of about 6 to 10 mm. Oxidant, such as, air, oxygen, or steam enters reactor vessel 402 through reagent inlet 405. In addition to or as an alternative, feed material 410 can also enter reactor vessel 402 through reagent inlet 405. In one embodiment, reagent inlet 405 corresponds to oxidant stream 18 of FIGS. 1 and 2. Introduction of feed material 410 and oxidant creates fluidized bed 407 in reactor vessel 402. Ash created in the gasification process is discharged through ash discharge 409, and synthesis gas generated in the gasification process is discharged through product gas outlet 403. The height of fluidized bed 407 will vary, depending on such factors as reactor vessel temperature and pressure and input rates of feed inlet 404 and reagent inlet 405, and discharge rates of ash discharge 409 and product gas outlet 403. In one embodiment, the flow of gas through reactor vessel 402 is configured to allow fluidized bed 407 to form.

Figure 5:
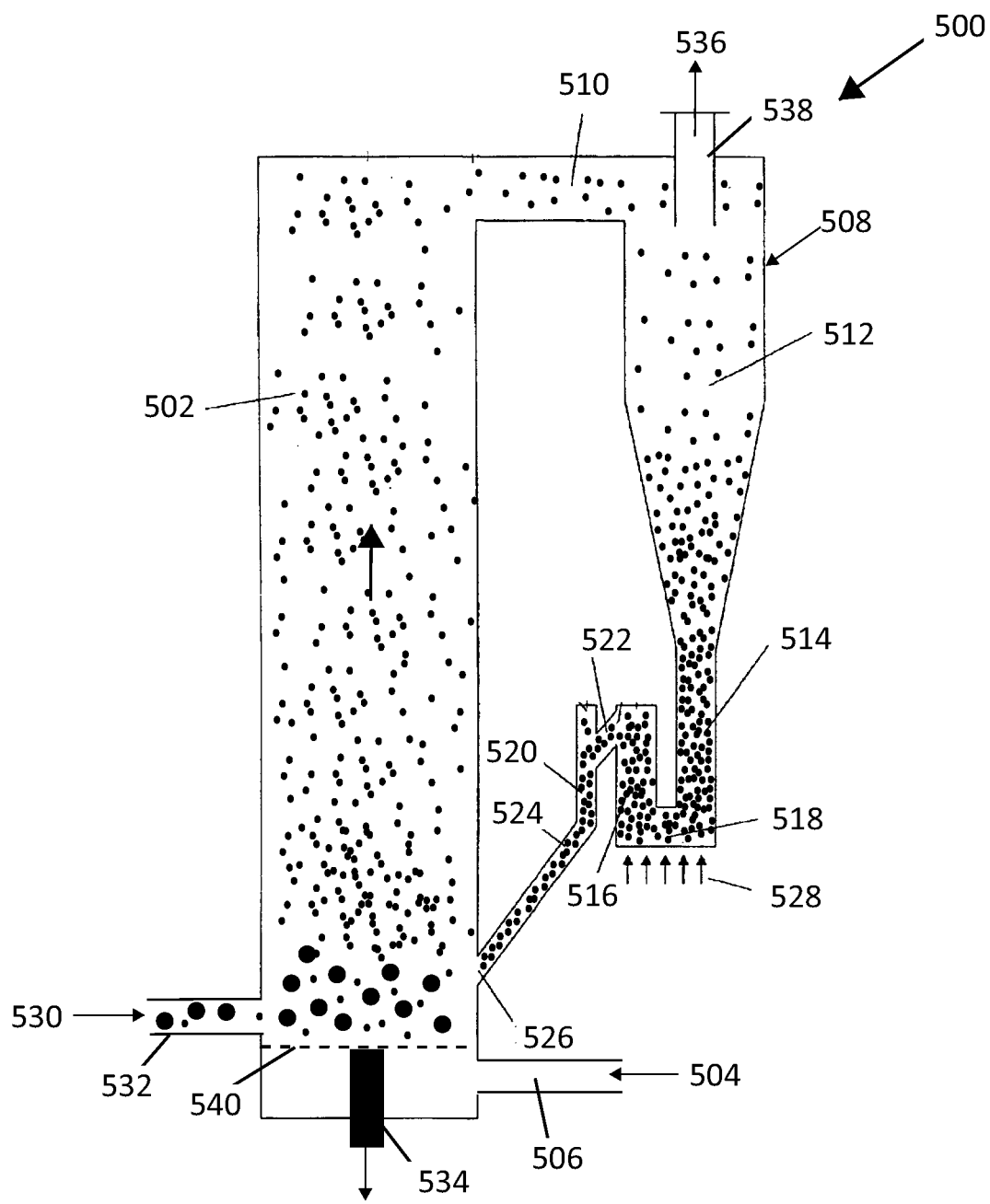
FIG. 5 shows an illustrative schematic of an exemplary circulating fluid-bed gasifier that can be used in one embodiment according to aspects of the invention.

In one embodiment, a circulating fluid bed comprises a centrifugal separator, generally a cyclone separator to separate and recirculate a portion of the solid particles, which are contained in the gas exiting a reactor vessel, back to the reactor vessel where feed material is gasified. In a preferred embodiment, the separated solid particles are fluidized prior to their recirculation into the reactor vessel to promote even distribution over the width of the fluidized bed in the reactor vessel. FIG. 5 provides one non-limiting exemplary embodiment of circulating fluidized bed gasifier with numeral reference 500. Gasifier 500 comprises reactor vessel 502, oxidant inlet 506 and feed inlet 532, which are disposed near a bottom portion of reactor vessel 502, and separator 508 coupled with an upper portion of reactor vessel 502 via opening 510. There can be one or more separators. Separator 508 preferably comprises a cyclone separator. As shown, separator 508 comprises chamber 512, which is coupled to standpipe 514, which itself is coupled to riser 516 through horizontal channel 518. As shown, riser 516 is coupled to riser 520 through inclined channel 522, and riser 520 in turn is coupled to reactor chamber 502 through inclined channel 524. Standpipe 514, riser 516, and horizontal channel 518 form a siphon-trap-like gas seal. In an alternative embodiment, inclined channel 522 and riser 520 can be omitted so that riser 516 can be coupled directly to reactor vessel 502 through inclined channel 524.

During operation, oxidant 504 enters reactor vessel 502 via oxidant inlet 506. Feed 530 comprising bottom fraction 16 and/or bottom fraction 26 enters reactor vessel 502 through feed inlet 532. Gasification of feed 530 takes place in reactor vessel 502 when oxidant 504 and feed 530 mix with one another. Gas comprising syngas and other reactants and products and entrained with solid particles in reactor vessel 502 move upward toward and through opening 510 and into separator 508. Separator 508 separates gas exiting reactor vessel 502 from the solid particles. Separated gas 536 exits gasifier 500 through outlet 538. The remaining solid particles are moved through standpipe 514, risers 516 and 520, horizontal channel 518, and inclined channels 522 and 524. The arrangement of standpipe 514, risers 516 and 520, horizontal channel 518, and inclined channels 522 and 524 allows solid particles to return to reactor chamber 502 and prevents unwanted escape of gas from reactor vessel 502 through opening 526 in the direction of cyclone separator 508.

To ensure that solids collected in the region of the gas seal formed by standpipe 514, riser 516, and horizontal channel 518 do not become compacted and deposited, fluidizing gas or air is supplied by means of fluidizing device 528 providing flow essentially from beneath horizontal channel 518. Ash 534 formed during gasification is discharged from gasifier 500 through or near a bottom portion of reactor vessel 502.

In one embodiment, the velocity of gas flowing through gasifier 500 is in a range of about 5 to 8 m/s or another other suitable velocity that can ensure most of the solid particles in reactor vessel 502 are entrained and flow upward to leave reactor vessel 502. In one embodiment, oxidant 504 can be fed as primary air into reactor vessel 502 below nozzle grate 540.

Figure 6:
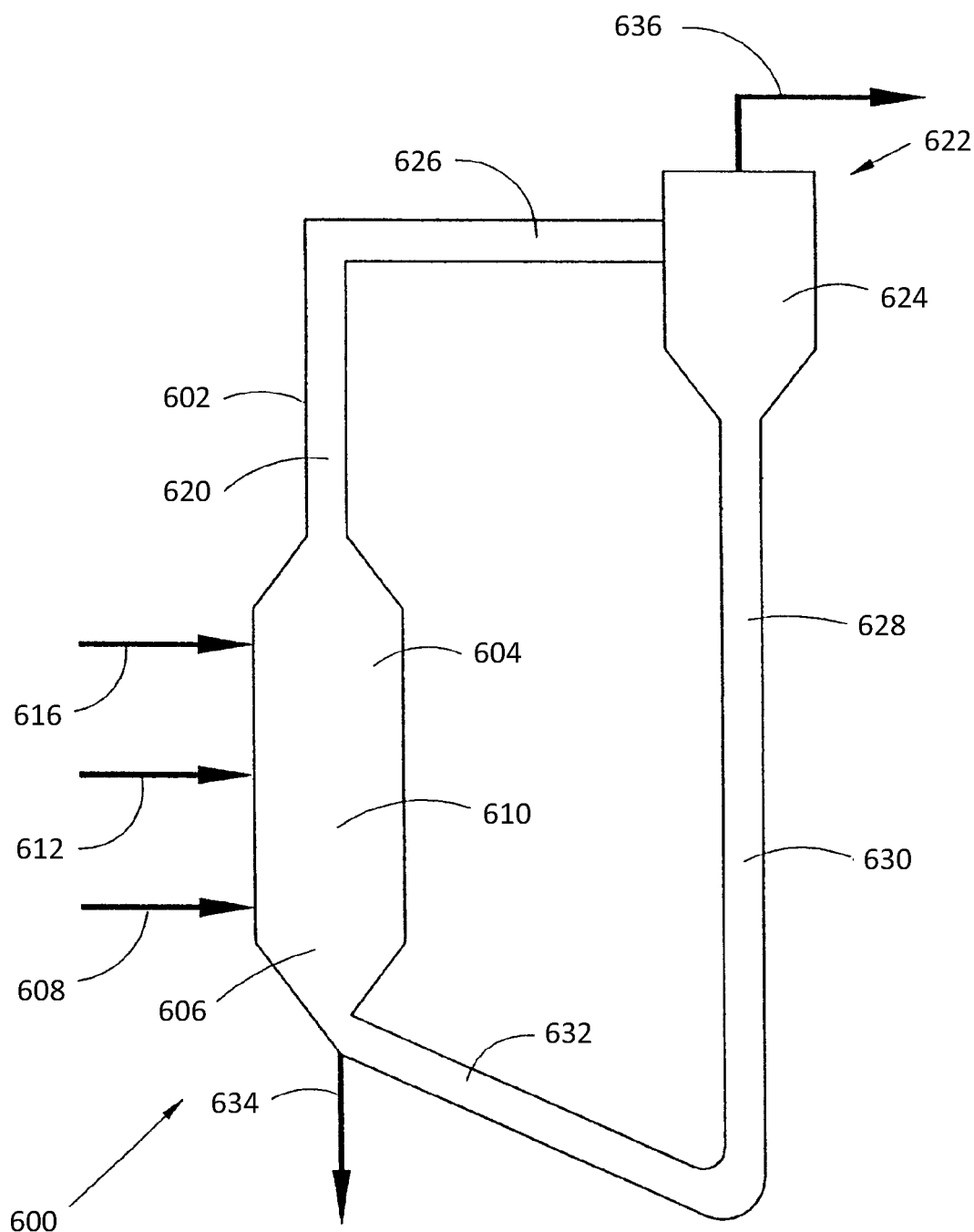
FIG. 6 shows an illustrative schematic of an exemplary transport fluid-bed gasifier that can be used in one embodiment according to aspects of the invention.

FIG. 6 provides one non-limiting exemplary embodiment of a transport fluid bed gasifier with numeral reference 600. Gasifier 600 comprises a riser 602 above mixing zone 604. As shown, mixing zone 604 includes partial oxidation zone 606 wherein recirculating particulates are oxidized to form a high velocity stream of products (primarily carbon monoxide) and finely divided particles, Oxidant is introduced to partial oxidation zone 606 through inlet 608. Oxidant is generally fed at a rate suitable to control the temperature of partial oxidation zone 606 and riser 12. Gasifier 600 further comprises feed injection zone 610, which is preferably disposed in mixing zone 604 above partial oxidation zone 606. Feed comprising bottom fraction 16 and/or bottom fraction 26 is injected through feed stream 612 into feed injection zone 610 and mixed with the high velocity stream of effluents and particles from partial oxidation zone 606.

Feed stream 612 can be introduced as a solution, slurry, emulsion, suspension, etc. of solids, liquids or gases depending on the state of bottom fraction 16 and/or bottom fraction 26 to be converted. Typically, solid can be dissolved and/or suspended in a hydrocarbon carrier liquid for ease of handling and pumping. Feed in feed stream 612 can be introduced to feed injection zone 610 and/or mixing zone 604 in stages as desired depending, in part, on the composition of the feed, composition of the reaction effluent gas and process parameters of gasifier 600 to ensure suitable operation thereof.

Steam is preferably injected into mixing zone 604 above feed injection zone 610 via inlet 616. Alternatively and/or additionally, steam can be injected with the feed. Steam can also be injected with oxidant in stream 608. The effluents of mixing zone 604 are passed under reducing conditions through the riser 602 where steam reacts with carbon and the feed to form hydrogen and carbon monoxide.

The high velocity partial oxidation products induce a rapid internal recirculation flow of carrier particles in riser 602 which act like a thermal flywheel to efficiently transfer heat from partial oxidation zone 606 to adiabatic pyrolysis zone 620 in riser 602 to supply heat for the endothermic gasification. Materials suitable for use as carrier particles circulating in gasifier 600 are finely divided refractory materials Which have a large surface area and are generally inert at the reaction conditions of the present process. Examples are particulated alumina and silica, and spent catalyst from a fluidized catalytic cracking (FCC) reactor.

The reaction effluent from riser 602 passes into separation zone 622 where carrier particles are recovered from the reaction effluent to give gas stream 636 that is essentially free of particulates. Separation zone 622 preferably comprises one or more high efficiency cyclone separation stages. Particle-laden reaction effluent from riser 602 is fed to cyclone 624 through line 626. Additional secondary cyclone separators (not shown) can be used if required.

Cyclone 624 is coupled to dipleg 628 having particles holdup zone 630 for increasing the residence time of the carrier particles, if desired, and transfer line 632 for conveying the particles to partial oxidation zone 606 at a rate sufficient to sustain continuous operation of the partial oxidation zone 606 and feed injection zone 610. Separation zone 622 further comprises bleed line 634 through which a portion of the solids from holdup zone 630 can be bled from gasifier 600 to maintain a desired maximum concentration of metals on the solids.

Depending on the design operating pressure, gasifier 600 can operate at a temperature suitable for promoting gasification without the need for any catalytic activity of the circulating carrier particles. Gasification can typically commence at a temperature as low as about 650 degrees C. Preferably, gasifier 600 operates in a temperature range of about 750 to 1050 degrees C., measured at an outlet of riser 602. The operating temperature range is generally controlled by specifying the rate of oxidant supply to partial oxidation zone 606 and the rate of carrier recirculation. Gasifier 600 can be designed to operate at an elevated pressure, up to about 4.0 MPa (about 600 psig), to increase handling capacity per unit reactor cross-sectional area.

With respect to the third type of gasifier, in general, entrained-flow gasifiers operate with the flow of feed and flow of thermal energy in a co-current manner. In a preferred embodiment, the residence time when the feed and thermal energy flow contact one another is in a range of about 0.1 to 20 seconds. If the feed is solid, it is formatted to a size of about less than 100 μm to promote mass transfer and allow transport in the gas. Entrained-flow gasifiers can handle a wide range of feed materials. The gasification usually takes place in a combustion chamber which operates at a temperature in the range of about 800 to 1700 degrees C., preferably about 1000 to 1700 degrees C., and at a pressure in the range of about 20 to 70 bar. In another embodiment, the outlet gas temperature of an entrained-flow gasifier is in a range of about 1250 to 1600 degrees C.

In general, entrained-flow gasifiers can have various configurations based on a combination of the location of the burner(s) and the lining of the gasifier. An entrained-flow gasifier can have one or more burners preferably located in the top portion or near a bottom portion of a reactor chamber. Further, an entrained-flow gasifier can comprise a refractory lined wall or a membrane wall. The refractory lined wall is configured to protect a reactor vessel from corrosive slag, thermal cycling. The membrane wall performs a similar function using a cooling screen protected by a layer of refractory material to provide a surface on which the molten slag solidifies and flows downwardly to the quench zone at the bottom of the reactor. In one embodiment, if bottom fraction 16 and/or bottom fraction 26 is fed to gasification system 17 as a dry feed, at least one gasifier in accordance with Shell Coal Gasification Process (SCGP) can be used. In another embodiment, if bottom fraction 16 and/or bottom fraction 26 is fed to gasification system 17 as a liquid feed, at least one gasifier in accordance with Shell Gasification Process (SGP) can be used. It is understood that the choice between a refractory lined gasifier and a membrane wall gasifier is determined by the ash properties of the feed as known to those skilled in the art. That is, a dry feed can be gasified using a gasifier in accordance with Shell Gasification Process (SGP), and a liquid feed can be gasified using a gasifier in accordance with Shell Coal Gasification Process (SCGP).

Figure 7:
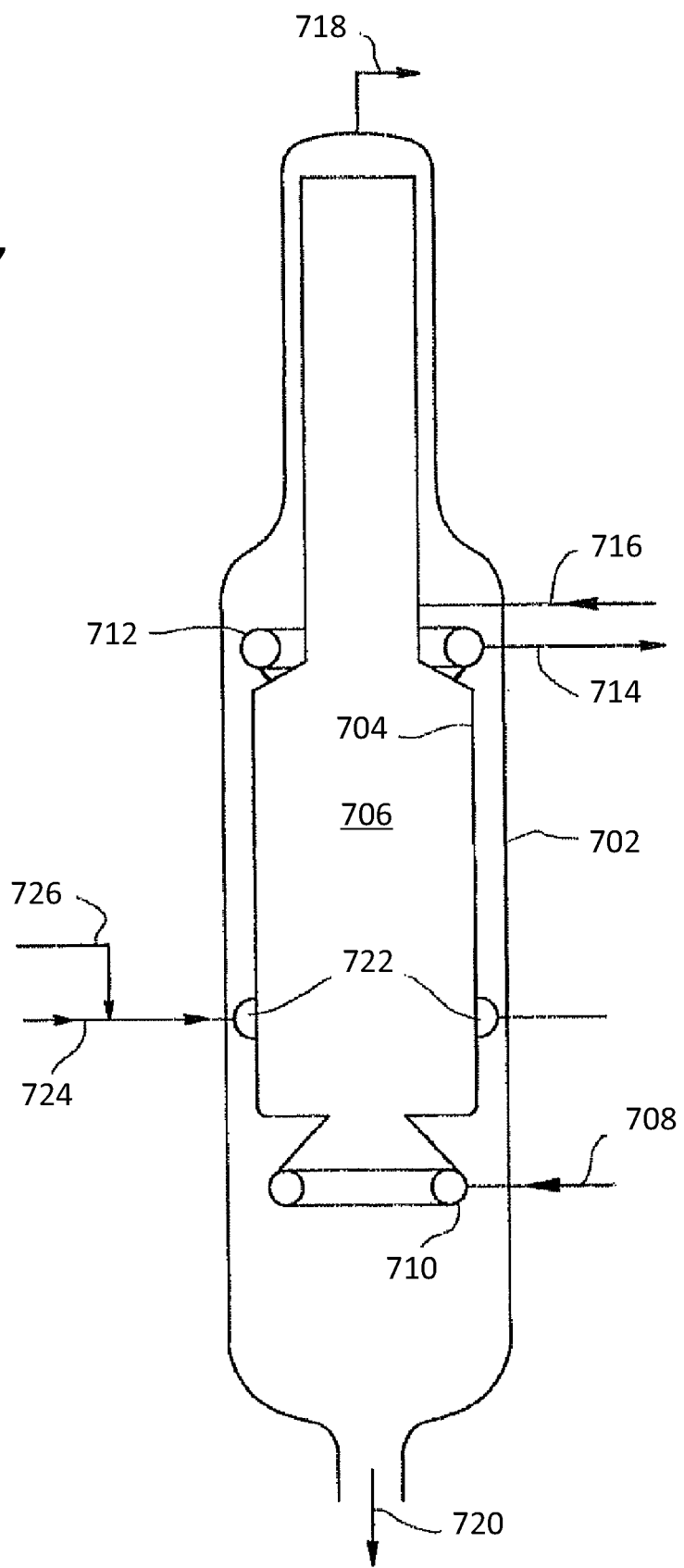
FIG. 7 shows an illustrative schematic of an exemplary entrained-flow gasifier with a membrane wall and diametrically opposed burners that can be used in one embodiment according to aspects of the invention.

FIG. 7 provides one non-limiting exemplary embodiment an entrained flow gasifier having numeral reference 700. Gasifier 700 has a similar configuration to that of a gasifier that can be used in the Shell Coal Gasification Process (SCEP). As shown, gasifier 700 has pressure shell 702, membrane wall 704 and reaction zone 706. In one embodiment, membrane wall 704 is composed of vertical conduits through which cooling fluid flows. The cooling fluid is preferably water. The cooling fluid is supplied to membrane wall 704 via supply line 708 to distributor 710. The used cooling fluid is discharged from gasifier 700 via common header 712 and discharge line 714. Gasifier 700 is further provided with quench gas supply 716, discharge line 718 for the product gas mixture, including syngas, generated in reaction zone 706, and discharge line 720 for slag. Gasifier 700 further comprises a layer of refractory material coupled to membrane wall 704 to further protect pressure shell 702 from the high temperature of reaction zone 706. Pressure shell 702 may comprise any suitable material, such as, for example, steel. Non-limiting examples of a suitable refractory material can include alloys of silica, alumina, iron, chromium, zirconium, and/or other high temperature materials.

As shown, gasifier 700 comprises at least two diametrically opposed burners 722 through which feed comprising bottom fraction 26 and/or bottom fraction 16 is introduced to reaction zone 706. Gasifier 700 can comprise any number of pairs of burners 722, for example, two or more pairs of such burners at the same elevation, or alternatively at different elevations. In a preferred embodiment, burners 722 are disposed near a bottom portion of gasifier 700. Any suitable burner can be used. Non-limiting exemplary suitable burners for a solid feed are, for example, described in U.S. Pat. No. 4,523,529 and U.S. Pat. No. 4,510,874. As shown, burners 722 are fed by feed supply line 724 and oxidant supply line 726, which are preferably mixed before being fed to burners 722. As shown, feed supply line 724 is mixed with oxidant supply line 726 near a nozzle of burners 722. Syngas formed from the gasification process can exit gasifier 700 through discharge line 718, and slag formed from the gasification process can exit gasifier 700 through discharge line 720.

In one embodiment, feed can be pulverized to a desired size and transported through feed supply line 724 as a dense phase in an inert gas (such as nitrogen or carbon dioxide), acting as a carrier gas. In another embodiment, viscous liquid feed can also be used.

During operation, feed mixed with oxidant is introduced to reaction zone 706 through burners 722. The reactions taking place in reaction zone 706 occurs rapidly, in a range of about 0.5 to 4 seconds. Product gas leaves gasifier 700 through discharge line 718, and slag leaves through discharge line 720 at or near the bottom of gasifier 700 where it is quenched in a water bath. In one embodiment, the operating temperature of gasifier 700 is about at least about 1000 degrees C. and the operating pressure of gasifier 700 is in a range of about 15 to 80 bar, preferably in a range of about 25 to 45 bar.

Figure 8:
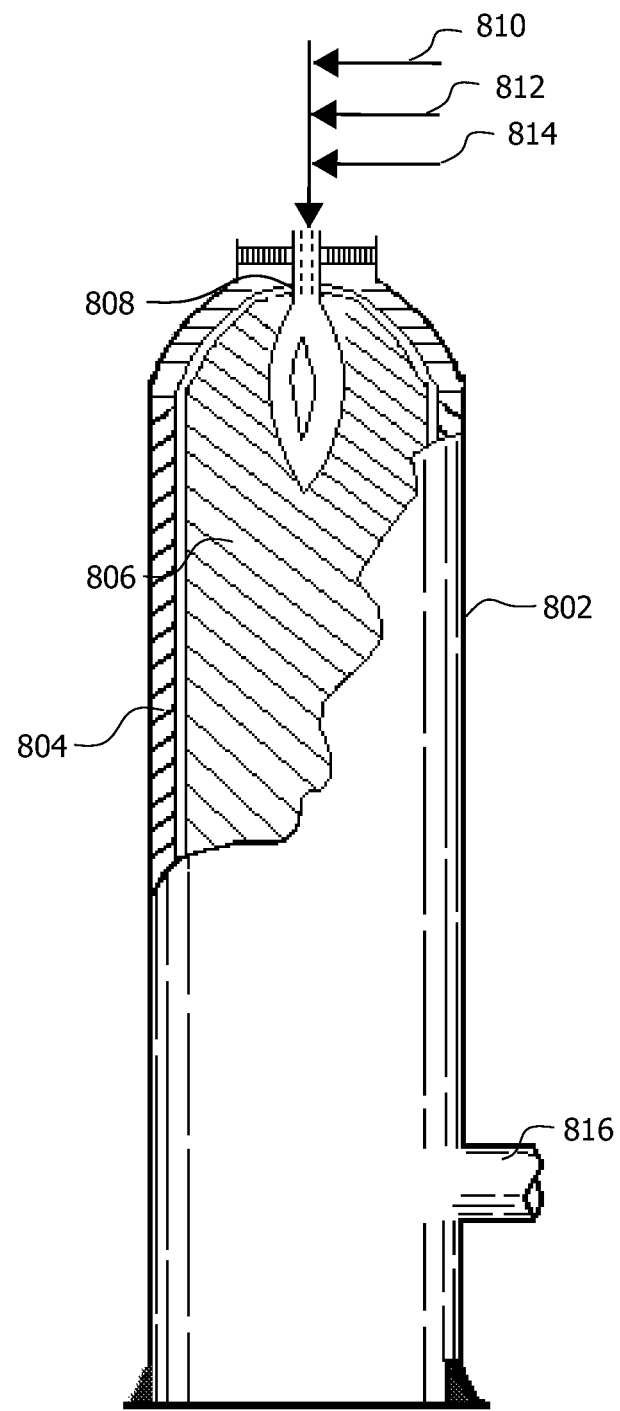
FIG. 8 shows an illustrative schematic of an exemplary entrained-flow gasifier with a refractory lined wall and a top burner that can be used in one embodiment according to aspects of the invention.

FIG. 8 provides one non-limiting exemplary embodiment an entrained flow gasifier having numeral reference 800. Gasifier 800 has a similar configuration to that of a gasifier that can be used in the Shell Gasification Process (SUP). As shown, gasifier 800 comprises pressure shell 802, refractory liner 804 and reaction zone 806. Pressure shell 802 may comprise any suitable material, such as, for example, steel. Non-limiting examples of a suitable refractory material for use as refractory liner 804 can include alloys of silica, alumina, iron, chromium, zirconium, and/or other high temperature materials.

As shown, gasifier 800 comprises burner 808 disposed at or near a top portion of gasifier 800 preferably with its outlet directed downwardly. Feed 810 formed from bottom fraction 26 and/or bottom fraction 16 is introduced to reaction zone 806 through burner 808. In a preferred embodiment, gasifier 800 comprises one burner. Any suitable burner can be used. Non-limiting exemplary suitable burners for a solid feed are, for example, described in U.S. Pat. No. 4,523,529 and U.S. Pat. No. 4,510,874. As shown, oxidant 812 and moderator gas 814 are also fed to burner 808 along with feed 810. The gasification product mixture is discharged from gasifier 800 via discharge line 816.

During operation, feed 810 preferably mixed with oxidant 812 and optionally moderator gas 814 is introduced to reaction zone 806 through burner 808. The reactions taking place in reaction zone 806 occurs rapidly, in a range of about 0.5 to 4 seconds. The product mixture is discharged from gasifier 800 through discharge line 816. In one embodiment, the operating temperature of gasifier 800 is about at least about 1300 degrees C. and the operating pressure of gasifier 800 is in a range of about 30 to 70 bar, preferably in a range of about 35 to 65 bar.

Figure 9A:
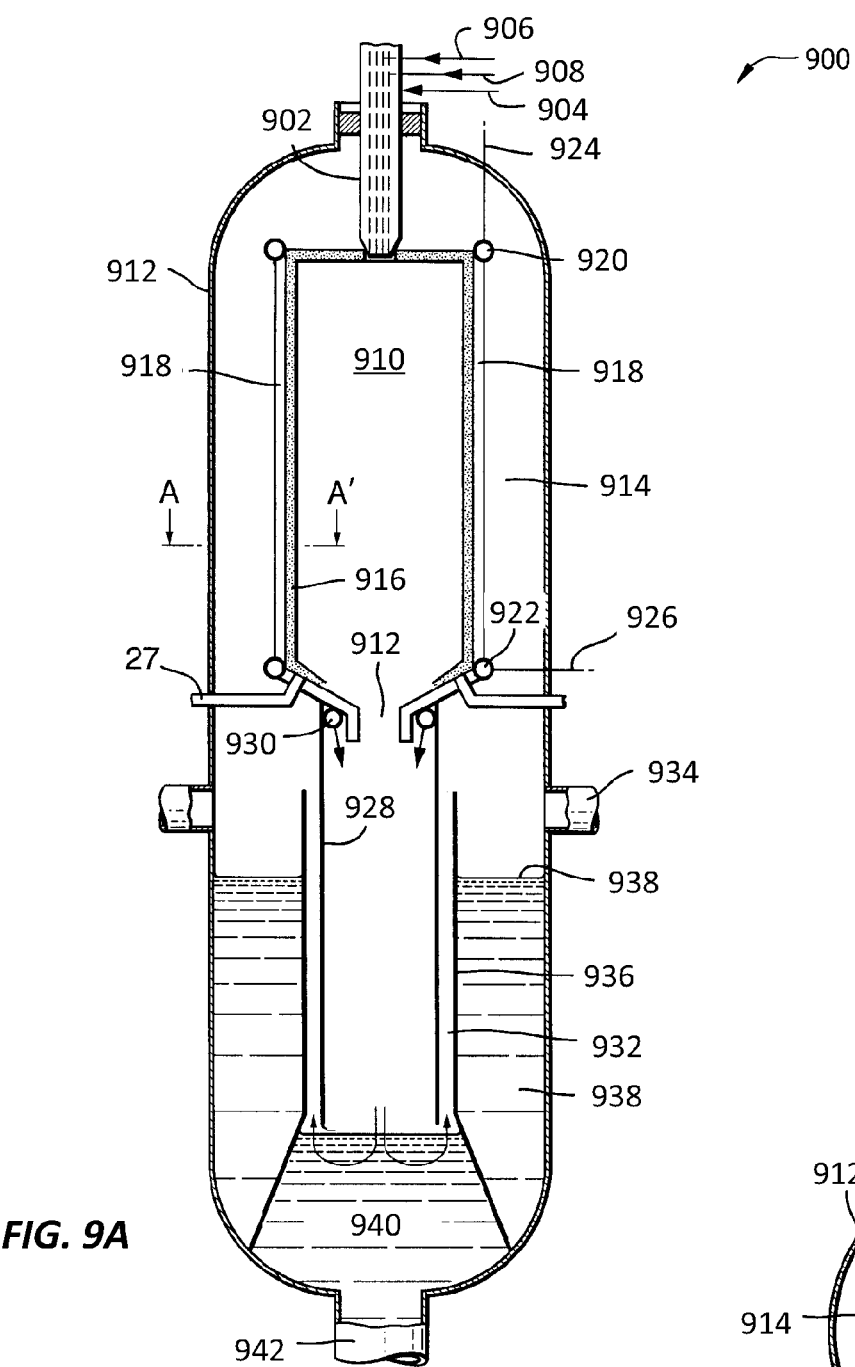
FIG. 9A shows an illustrative schematic of an exemplary entrained-flow gasifier with a membrane wall and a top burner that can be used in one embodiment according to aspects of the invention.
Figure 9B:
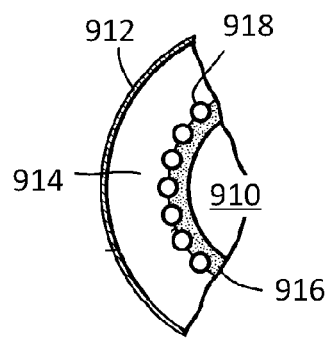
FIG. 9B is a cross-sectional view taken along the line A-A' of FIG. 9A.

FIG. 9A provides a cross sectional view of one non-limiting exemplary embodiment an entrained flow gasifier having numeral reference 900. Like gasifier 700 of FIG. 7, gasifier 900 has a membrane lined wall; but unlike gasifier 700, the burner of gasifier 900 is located at or near a top portion of the gasifier. As shown, gasifier 900 comprises burner 902 disposed at or near a top portion of gasifier 900, and burner 902 is preferably with its outlet directed downwardly. In a preferred embodiment, burner 902 is provided with oxidant supply conduit 904, feed supply conduit 906, and moderator gas supply conduit 908. Gasifier 900 preferably comprises combustion chamber 910 in the upper half of gasifier 900. As shown, combustion chamber 910 is provided with product gas outlet 912 at the bottom end and an opening for the outlet of the burner at its top end. Between combustion chamber 910 and the inner wall of pressure shell 912 is annular space 914. Combustion chamber 910 comprises refractory layer 916 configured to reduce the heat transfer to pressure shell 912. Refractory layer 916 is preferably coupled to cooling conduit 918 configured to cool refractory layer 916 by allowing water to flow therethrough. In the embodiment shown, cooling conduit 918 is arranged as a plurality of vertical tubes surrounding refractory layer 916. FIG. 9B is a cross-sectional view taken along the line A-A' of FIG. 9A, which further depicts the vertical tubes of cooling conduit 918. In another embodiment, conduits 918 may be arranged spirally wound around refractory layer 916. Cooling conduit 918 can be coupled to the inner wall or outer wall of refractory layer 918. As shown, the vertical tubes of cooling conduit 918 may optionally have common header 920 disposed at a top portion and common distributor 922 at a bottom portion for discharging water from and supplying water to cooling conduit 918, respectively. Common header 920 is in fluid communication with steam discharge conduit 924 and common distributor 922 is in fluid communication with water supply conduit 926. Annular space 914, refractory layer 916, and conduits 918 are configured to protect pressure shell 912 against the high temperatures of combustion chamber 910. The vertical tubes of cooling conduit 918 shown in FIGS. 1 and 2 can also be referred to as a membrane wall.

Cooling of refractory layer 916 by cooling conduit 918 may be achieved by heat exchange with water of a lower temperature entering common distributor 922 and flowing through cooling conduit 918. Coupled to product gas outlet 912 is passage 928 configured to direct product mixture exiting combustion chamber 910 toward quenching zone 940, which is disposed at or near a bottom portion of gasifier 900. Passage 928 further comprises outlet 930 that allows the addition of a quenching medium to the product mixture leaving combustion chamber 910.

As shown, gasifier 900 further comprises pathway 932 that allows the product mixture to flow upward to exit gasifier 900 through outlet 934. Pathway 932 is preferably an annular space between passage 928 and intermediate wall 936. In FIG. 9A, space 938 between intermediate wall 936 and pressure shell 912 holds water at level 938. Outlet 934 is located above water level 938. Referring to FIG. 9A, quenching zone 940 is contained in the space below the end of passage 928 and between intermediate wall 936 and a bottom portion of pressure shell 912. Quenching zone 940 also comprises slag generated from the gasification process, which can be discharged from gasifier 900 via outlet 942.

In one embodiment where an entrained-flow gasifier is used, oxidant is preheated and mixed with a moderator gas before the mixture is combined with feed prior to being fed to the burners of the gasifier. In one embodiment, the burners of an entrained-flow gasifier comprise a pressure atomizing burner. In another embodiment, the burner of an entrained-flow gasifier comprises a co-annular or multi-orifice burner comprising blast atomization. Exemplary descriptions of a multi-orifice burner are provided by U.S. Pat. No. 5,273,212 and U.K. Patent Application Publication No. GB2034456, the disclosures of which are incorporated herein by reference.

In general, in an exemplary embodiment, a multi-orifice burner comprises a number of slits at the burner outlet and hollow wall members with internal cooling fluid passages. The passages may or may not converge at the burner outlet. Instead of comprising internal cooling fluid passages, the burner may be provided with a suitable ceramic or refractory lining applied onto or suspended adjacent to an outer surface of the burner (front) wall for resisting the heat load during operation of the burner. In certain embodiments, an exit of one or more passages may be retracted or protruded. The burner preferably has 4, 5, 6 or 7 passages. A particular exemplary process to gasify liquid feed using an entrained flow gasifier equipped with a multi-orifice burner is provided by EPO Application Publication No. EP759886, the disclosure of which is incorporated herein by reference. In general, EP759886 describes a process for partial oxidation of a liquid carbonaceous feed where an oxidant and a liquid carbonaceous feed are supplied to a gasification zone through a multi-orifice (co-annular) burner, such as those disclosed by U.S. Pat. No. 5,273,212 and GB2034456, comprising a concentric arrangement of n passages or channels coaxial with the longitudinal axis of the burner. As disclosed by EP759886, in a particular embodiment, the oxidant, liquid carbonaceous feed, and a moderator gas are each supplied through separate channels of a multi-orifice (co-annular) burner having 6 passages. In one embodiment, either the oxidant or moderator gas is passed through the outermost passage. In another embodiment where n is greater than or equal to 4, either the oxidant or moderator gas is also passed through the innermost passage. In a non-limiting exemplary embodiment, the carbonaceous feed has a viscosity in a range of about 1 to 1000 cP and passes through one or more passages at a velocity in a range of about 2 to 30 m/s; the oxidant passes through one or more of the other passages at a velocity in a range of about 20 to 140 m/s; and the moderator gas passes through one or more of the remaining passages at a velocity in a range of about 5 to 140 m/s. In instances where viscous feed has a high content of volatile components, the gasification process described in U.S. Pat. No. 7,569,156 can be used. The disclosure of U.S. Pat. No. 7,569,156 is incorporated herein by reference.

In one embodiment, if a multi-orifice burner is used with a gasifier similar to gasifier 700 of FIG. 7, the number of passages is preferably 2. In another embodiment, if a multi-orifice burner is used with a gasifier similar to gasifier 800 or 900, the number of passages is preferably 2 to 6.

It is understood that one of ordinary skill in the art can select the appropriate gasifier(s) and operating conditions associated with the particular gasifier(s) based on properties of bottom fraction 16 and/or bottom fraction 26 entering gasification system 17. Vice versa, properties of bottom fraction 16 and/or 26 can be adjusted to a certain extent to match the desired operating conditions of selected gasifier (s). A combination of both is also possible where properties of bottom fraction 16 and/or bottom fraction 26 as well as type and operating conditions of selected gasifier(s) can be modified to achieve desired or optimal results, such as cost, efficiency, product quality, etc.

For example, if bottom fraction 16 and/or bottom fraction 26 are sufficiently fluid to be pumped, the slurry can be introduced into gasification system 17 alone, or as a suspension using a carrier fluid (not shown), such as air, nitrogen, carbon dioxide, carbon monoxide, syngas, hydrogen, steam, nitrogen-free gas, low-oxygen gas, oxygen-free gas, and/or a combination of these carrier fluids. In embodiments where bottom fraction 16 and/or bottom fraction 26 are sufficiently fluid to be pumped, gasification system 17 preferably comprises at least one entrained-flow gasifier.

In another embodiment where the mixture is a solid at ambient temperature, it can be dried and pulverized by an appropriate milling or crushing apparatus, such as one or a series of ball mills, to produce a flowable solid. It can then be introduced into the gasifier using a conventional solid feed apparatus or with a carrier fluid. In a further embodiment where separation zone 14 may be remote from gasification system 17, e.g., in another facility, bottom fraction 16 and/or bottom fraction 26 can be collected in a storage vessel and dried to pellets by standard methods for easy handling and transporting. In embodiments where bottom fraction 16 and/or bottom fraction are introduced to gasification system 17 as a solid, gasification system 17 can preferably comprise any of the three types of gasifier: moving-bed, fluid-bed, or entrained flow. The size of the solid particles fed to the gasifier is preferably formatted to suit the operating conditions of the selected gasifier(s).

In one embodiment, one or more sorbents can also be introduced to gasification system 17. The sorbents can capture one or more contaminants from the syngas, such as sodium vapor in the gas phase within a gasifier.

In one embodiment, gas mixture 19 discharged from gasification system 17 can be routed to WGS zone 20. In one embodiment, at least a portion of gas mixture 19 can be further processed before it is introduced to reaction zone 20. Further processing can be part of gasification system 17. For example, in certain embodiments, gasification system 17 can further comprise one or more particulate removal systems (not shown) and/or one or more cooling zones (not shown). In other embodiments, gasification system 17 can also include one or more hydrogen separators (not shown).

One or more particulate removal systems can be used to partially or completely remove any particulates from the syngas to provide the particulates or particulate-containing fluid and a separated syngas. The particulate removal system can include a separation device for example conventional disengagers and/or cyclones. Particulate control devices ("PCD") capable of providing an outlet particulate concentration below the detectable limit of about 0.1 parts per million by weight (ppmw) can also be used. Examples of suitable PCDs can include, but are not limited to, sintered metal filters, metal filter candles, and ceramic filter candles (for example, iron alum inide filter material). The particulates, for example, fine ash, coarse ash, and combinations thereof, can be recycled to the gasifier, purged from the system, utilized as the particulates, or any combination thereof.

Figure 10:
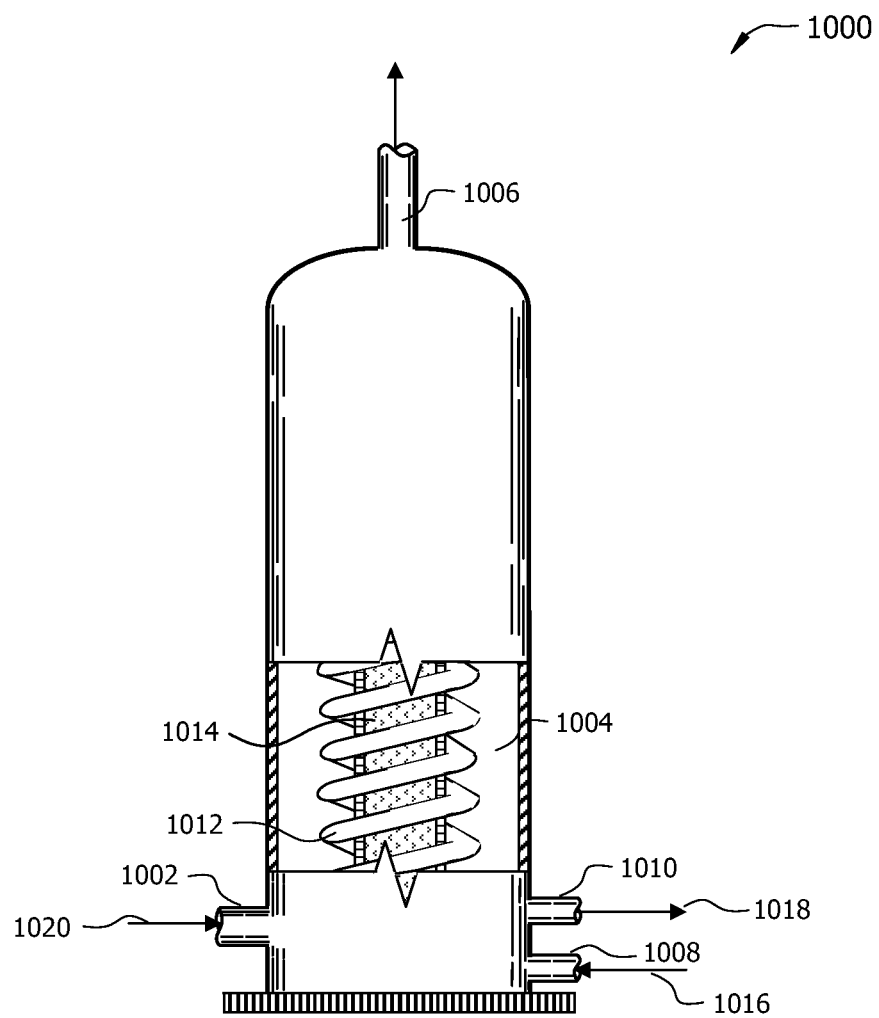
FIG. 10 is shows an illustrative schematic of an exemplary cooling system that can be used in one embodiment according to aspects of the invention.

If desired or necessary, the separated syngas can be cooled in one or more syngas coolers in one or more cooling zones. For example, the syngas can be cooled to about 540 degrees C. or less, such as about 300 degrees C., using a suitable heat exchange system known to those skilled in the art. If a cooling zone is used, an exemplary non-limiting embodiment of a cooling zone is depicted in FIG. 10, with numeral reference 1000. Cooling system 1000 comprises gasification product inlet 1002, cooling chamber 1004, cooled gasification product outlet 1006, cooling fluid inlet 1008, and heated fluid outlet 1010. Cooling chamber 1004 comprises one or more conduits 1012 that wraps around cooling passage 1014. In a preferred embodiment, cooling chamber 1004 comprises two conduits 1012. The inlet of one or more conduits 1012 is disposed at or near gasification product inlet 1006 and is arranged such that an outlet of a gasifier is coupled to inlet 1006 so gasification product 1020 exiting a gasifier and enters one or more conduits 1012. Cooling fluid inlet 1008 is coupled to cooling passage 1014 such that cooling fluid 1016 entering inlet 1008 flows through passage 1014 and exits cooling system 1000 as heated fluid 1018 through outlet 1010. It is understood that the location and/or position of various inlets and outlets with respect to a top or bottom portion of cooling system 1000 can be modified as appropriate.

During operation of the embodiment shown in FIG. 10, gasification product 1020 enters cooling system 1000 through inlet 1002 and flows through one or more conduits 1012 upward and exits cooling system 1000 through outlet 1006 at a temperature that is lower than the temperature when it entered cooling system 1000. Cooling fluid 1016 enters cooling system 1000 through inlet 1008 and flows through passage 1014 and exits cooling system 1000 as heated fluid 1018 through outlet 1010. Heated fluid 1018 has a higher temperature than cooling fluid 1016. The flow of gasification product 1020 around the flow of cooling fluid 1016 through passage 1014 allows for heat exchange between gasification product 1020 and cooling fluid 1016, thereby cooling gasification product 1020 while heating up cooling fluid 1016.

In certain embodiments, the separated and/or cooled syngas can be treated within a gas purification system to remove contaminants. The gas purification system can include a system, a process, or a device to remove sulfur and/or sulfur-containing compounds from the syngas. Examples of a suitable catalytic gas purification system include, but are not limited to, systems using zinc titanate, zinc ferrite, tin oxide, zinc oxide, iron oxide, copper oxide, cerium oxide, or mixtures thereof. Examples of a suitable process-based gas purification system include, but are not limited to, the SELEXOL® process, the RECTISOL® process, the CRYSTASULF® process, and the Sulfinol gas treatment process.

In one embodiment, one or more amine solvents such as methyl-diethanolamine (MDEA) can be used to remove acid gas from the syngas. Physical solvents, for example SELEXOL® (dimethyl ethers of polyethylene glycol) or RECTISOL® (cold methanol), can also be used. If the syngas contains carbonyl sulfide (COS), the carbonyl sulfide can be converted by hydrolysis to hydrogen sulfide by reaction with water over a catalyst and then absorbed using the methods described above. If the syngas contains mercury, the mercury can be removed using a bed of sulfur-impregnated activated carbon.

One or more catalysts, such as a cobalt-molybdenum ("Co—Mo") catalyst can be incorporated into the gas purification system to perform a sour shift conversion of the syngas. The Co—Mo catalyst can operate at a temperature of about 288° C. in the presence of $H_2S$, for example, about 100 parts per million by weight (ppmw) $H_2S$. If a Co—Mo catalyst is used to perform a sour shift, subsequent downstream removal of sulfur can be accomplished using any of the above described sulfur removal methods and/or techniques.

Gasification system 17 can also discharge ash or slag material (not shown), such as that described above. The slag material is optionally recycled back to gasification system 17 to increase the content of solid ash-forming materials.

In WGS zone 20, carbon monoxide is converted to hydrogen in the presence of steam through the water-gas shift reaction represented by $CO+H_2O \rightarrow CO_2+H_2$. In one embodiment, steam generated by gasification system 17 and/or a heat exchanger, if used, can provide at least a portion of the steam for the water-gas shift reaction. The water-gas shift process is well established as a means to increase the hydrogen content and/or reduce the carbon monoxide content of synthesis gases produced by gasification of carbonaceous material. In WGS zone 20, carbon monoxide reacts with steam at high temperature, and optionally in the presence of one or more catalysts, to yield carbon dioxide and hydrogen. A mixture of hydrogen, carbon dioxide, unreacted carbon monoxide and other impurities is discharged from WGS zone 20 as shifted synthesis gas. At least a portion of the hydrogen generated in WGS zone 20 is provided to hydrocatalytic treatment system 12 via hydrogen stream 21 for use in hydrocatalytic reactions.

In a preferred embodiment, WGS zone 20 can comprise one or more shift reactors to adjust the hydrogen to carbon monoxide ratio ($H_2$:CO) of the syngas by converting CO to $CO_2$. Within a shift reactor, a water-gas shift reaction reacts at least a portion of the carbon monoxide in the syngas with water in the presence of a catalyst and a high temperature to produce hydrogen and carbon dioxide. Examples of a suitable shift reactor can include, but are not limited to, single stage adiabatic fixed bed reactors, multiple-stage adiabatic fixed bed reactors with interstage cooling, steam generation or cold quench reactors, tubular fixed bed reactors with steam generation or cooling, fluidized bed reactors, or any combination thereof. A sorption enhanced water-gas shift (SEWGS) process, utilizing a pressure swing adsorption unit having multiple fixed bed reactors packed with shift catalyst and at high temperature, e.g. a carbon dioxide adsorbent at about 480° C., can be used. Various shift catalysts can be employed.

In one embodiment, the shift reactor can include two reactors arranged in series. A first reactor can be operated at high temperature (about 340° C. to about 400° C.) to convert a majority of the CO present in the syngas to CO, at a relatively high reaction rate using an iron-chrome catalyst. A second reactor can be operated at a relatively low temperature (about 145° C. to about 205° C.) to complete the conversion of CO to $CO_2$ using a mixture of copper oxide and zinc oxide.

In one embodiment, at least a portion of gas mixture 19 can be directed to a hydrogen separator (not shown) before it is routed to WGS zone 20. In another embodiment, which is not shown, at least a portion of gas mixture 19 can bypass WGS zone 20 and can be fed directly to the hydrogen separator. At least a portion of the hydrogen separated by the hydrogen separator can be fed to hydrocatalytic treatment system 12.

The hydrogen separator can include any system or device to selectively separate hydrogen from syngas to provide a purified hydrogen stream and a waste gas stream. The hydrogen separator can provide a carbon dioxide rich fluid and a hydrogen rich fluid. The hydrogen separator can utilize pressure swing absorption, cryogenic distillation, and/or semi-permeable membranes. Examples of suitable absorbents include, but are not limited to, caustic soda, potassium carbonate or other inorganic bases, and/or alanolamines.

In one embodiment, the hydrogen generated in WGS zone 20 and/or separately by a hydrogen separator can be routed to processing zone 22 for use in hydrocatalytic reactions including further catalytic reduction reactions (e.g., hydrogenation reactions, hydrogenolysis reactions, hydrotreating reactions, and the like), further condensation reactions, isomerization reactions, oligomerization reactions, and any combination thereof.

Accordingly, the hydrogen used in a hydrocatalytic reaction of system 12 can include external hydrogen, recycled hydrogen, in situ generated hydrogen, and any combination thereof. The term "in situ generated hydrogen" as used herein refers to hydrogen that is produced within the overall process; it is not limited to a particular reactor for production or use and is therefore synonymous with an in process generated hydrogen. As explained, at least one source of the hydrogen used in hydrocatalytic treatment system 12 comes from gasification of bottom fraction 16 and/or bottom fraction 26, which is a product of hydrocatalytic treatment system 12.

Descriptions of exemplary suitable hydrocatalytic reactions that can take place in hydrocatalytic treatment system 12 are known to those skilled in the art and/or provided by U.S. Application Publication Nos. US2011/0154721, US2012/0152836, US2012/0156743, and US2013/0109896, and U.S. Application Nos. 61/665,641, filed on Jun. 28, 2012, and 61/720,757, filed on Oct. 31, 2012, and 61/817, 996, where each disclosure is incorporated herein by reference. Likewise, descriptions of exemplary suitable further processing reactions that can take place in processing zone 22 are known to those skilled in the art and/or provided by the materials that have been incorporated by reference in their entirety. Accordingly, the details of hydrocatalytic reactions and further processing reactions need not be repeated.

Nevertheless, the descriptions below highlight some aspects of certain hydrocatalytic reactions, such as hydrothermal digestion and catalytic reduction reactions, and further processing reactions. It is understood that hydrocatalytic treatment system 12 can comprise any number, combination, and type of reactors to perform one or more hydrocatalytic reactions.

In certain embodiments where hydrocatalytic treatment system 12 comprises hydrothermal digestion and one or more catalytic reduction reactions, the hydrothermal digestion and one or more catalytic reduction reactions take place in the same vessel, which can provide an effective stabilization of soluble carbohydrates. The foregoing may be accomplished by including a slurry catalyst capable of activating molecular hydrogen within a hydrothermal digestion unit containing cellulosic biomass solids. That is, the catalyst that is capable of activating molecular hydrogen may comprise a slurry catalyst. As used herein, the term "slurry catalyst" refers to a catalyst comprising fluidly mobile catalyst particles that can be at least partially suspended in a fluid phase via gas flow, liquid flow, mechanical agitation, or any combination thereof. Formation of the reaction product may reduce the amount of thermal decomposition that occurs during hydrothermal digestion, thereby enabling high yield conversion of cellulosic biomass solids into a desired reaction product to take place in a timely manner.

Once the soluble carbohydrates have been at least partially transformed into a more stable reaction product during hydrothermal digestion, completion of the conversion of the soluble carbohydrates into the reaction product may take place in a separate catalytic reduction reactor unit that also employs the slurry catalyst or a different catalyst that is capable of activating molecular hydrogen. The transformation that takes place in the catalytic reduction reactor unit may comprise a further reduction in the degree of oxidation of the initial reaction product, an increased conversion of soluble carbohydrates into oxygenated intermediates, or both. As used herein, the term "oxygenated intermediates" refers to alcohols, polyols, ketones, aldehydes, and mixtures thereof that are produced from a catalytic reduction reaction of soluble carbohydrates.

Continuous, high temperature hydrothermal digestion may be accomplished by configuring the biomass conversion systems such that fresh biomass may be continuously or semi-continuously supplied to the hydrothermal digestion unit, while it operates in a pressurized state. As used herein, the term "continuous addition" and grammatical equivalents thereof will refer to a process in which cellulosic biomass is added to a hydrothermal digestion unit in an uninterrupted manner without fully depressurizing the hydrothermal digestion unit. As used herein, the term "semi-continuous addition" and grammatical equivalents thereof will refer to a discontinuous, but as-needed, addition of biomass to a hydrothermal digestion unit without fully depressurizing the hydrothermal digestion unit.

In some embodiments described herein, a slurry catalyst may be used both in the hydrothermal digestion unit and in the catalytic reduction reactor unit to mediate the catalytic reduction reaction of soluble carbohydrates into a reaction product. Retention of the slurry catalyst in the hydrothermal digestion unit may also be aided by the low recycle ratios that may be used in the biomass conversion systems described herein. In any event, circulation of the slurry catalyst through the cellulosic biomass charge within the hydrothermal digestion unit can provide good catalyst distribution within the biomass, thereby allowing soluble carbohydrates to be effectively stabilized via a catalytic reduction reaction as soon as possible following their formation.

Since a slurry catalyst can be fluidly mobile, hydrogen sparge, solvent recycle, or any combination thereof may be used to distribute the slurry catalyst throughout the cellulosic biomass charge in the hydrothermal digestion unit. Good catalyst distribution in the cellulosic biomass may improve yields by intercepting soluble carbohydrates before they have an opportunity to degrade. Furthermore, use of a slurry catalyst may allow a fixed bed digestion unit to be more successfully used, since mechanical stirring or like mechanical agitation is not needed to affect catalyst distribution. This can allow higher biomass to solvent ratios to be utilized per unit volume of the digestion unit than would be possible in stirred tank or like digestion unit configurations. Furthermore, since stirring is not necessary, there is no express need to alter the size of the biomass solids prior to digestion taking place.

In one embodiment, poison-tolerant slurry catalyst is used. Use of a poison-tolerant catalyst may be particularly desirable, since catalyst poisons are not removed from the cellulosic biomass solids before hydrothermal digestion and integrated catalytic reduction take place. As used herein, a "poison-tolerant catalyst" is defined as a catalyst that is capable of activating molecular hydrogen without needing to be regenerated or replaced due to low catalytic activity for at least about 12 hours of continuous operation.

In some embodiments, suitable poison-tolerant catalysts may include, for example, sulfided catalysts. In some or other embodiments, nitrided catalysts may be used as poison-tolerant catalysts. Sulfided catalysts suitable for activating molecular hydrogen are described in commonly owned U.S. application Ser. Nos. 13/495,785, filed on Jun. 13, 2012, and 61/553,591, filed on Oct. 31, 2011, each of which is incorporated herein by reference in its entirety. Sulfiding may take place by treating the catalyst with hydrogen sulfide or an alternative sulfiding agent, optionally while the catalyst is disposed on a solid support. In more particular embodiments, the poison-tolerant catalyst may comprise a sulfided cobalt-molybdate catalyst, such as a catalyst comprising about 1-10 wt. % cobalt oxide and up to about 30 wt. % molybdenum trioxide prior to sulfidation. In other embodiments, catalysts containing Pt or Pd may also be effective poison-tolerant catalysts for use in the techniques described herein. When mediating in situ catalytic reduction reaction processes, sulfided catalysts may be particularly well suited to form reaction products comprising a substantial fraction of glycols (e.g., $C_2$-$C_6$ glycols) without producing excessive amounts of the corresponding monohydric alcohols. Although poison-tolerant catalysts, particularly sulfided catalysts, may be well suited for forming glycols from soluble carbohydrates, it is to be recognized that other types of catalysts, which may not necessarily be poison-tolerant, may also be used to achieve a like result in alternative embodiments. As will be recognized by one having ordinary skill in the art, various reaction parameters (e.g., temperature, pressure, catalyst composition, introduction of other components, and the like) may be modified to favor the formation of a desired reaction product. Given the benefit of the present disclosure, one having ordinary skill in the art will be able to alter various reaction parameters to change the product distribution obtained from a particular catalyst and set of reactants.

Catalysts that are not particularly poison-tolerant may also be used in conjunction with the techniques described herein. Such catalysts may include, for example, Ru, Pt, Pd, or compounds thereof disposed on a solid support such as, for example, Ru on titanium dioxide or Ru on carbon. Although such catalysts may not have particular poison tolerance, they may be regenerable, such as through exposure of the catalyst to water at elevated temperatures, which may be in either a subcritical state or a supercritical state.

In some embodiments, slurry catalysts suitable for use in the methods described herein may be sulfided by dispersing a slurry catalyst in a fluid phase and adding a sulfiding agent thereto. Suitable sulfiding agents may include, for example, organic sulfoxides (e.g., dimethyl sulfoxide), hydrogen sulfide, salts of hydrogen sulfide (e.g., NaSH), and the like. In some embodiments, the slurry catalyst may be concentrated in the fluid phase after sulfiding and then added to the hydrothermal digestion unit.

In some embodiments, the slurry catalyst may be operable to generate molecular hydrogen. For example, in some embodiments, catalysts suitable for aqueous phase reforming (i.e., APR catalysts) may be used. Suitable APR catalysts may include, for example, catalysts comprising platinum, palladium, ruthenium, nickel, cobalt, or other Group VIII metals alloyed or modified with rhenium, molybdenum, tin, or other metals, or sulfided. However, in other embodiments, an external hydrogen feed may be used, optionally in combination with internally generated hydrogen.

In various embodiments, slurry catalysts used in embodiments described herein may have a particulate size of about 250 microns or less. In some embodiments, the slurry catalyst may have a particulate size of about 100 microns or less, or about 10 microns or less. In some embodiments, the minimum particulate size of the slurry catalyst may be about 1 micron.

In general, digestion in the hydrothermal digestion unit may be conducted in a liquor phase. In some embodiments, the liquor phase may comprise a digestion solvent that comprises water. In some embodiments, the liquor phase may further comprise an organic solvent. Although any organic solvent that is at least partially miscible with water may be used as a digestion solvent, particularly advantageous organic solvents are those that can be directly converted into fuel blends and other materials without being separated from hydrocatalytically treated mixture 13. That is, particularly suitable organic solvents are those that may be co-processed along with hydrocatalytically treated mixture 13 into fuel blends and other materials during further processing reactions. Suitable organic solvents in this regard may include, for example, ethanol, ethylene glycol, propylene glycol, glycerol, and any combination thereof. In some embodiments, the organic solvent may comprise oxygenated intermediates produced from a catalytic reduction reaction of soluble carbohydrates. For example, in some embodiments, a digestion solvent may comprise oxygenated intermediates produced by a hydrogenolysis reaction or other catalytic reduction reaction of soluble carbohydrates. In some embodiments, the oxygenated intermediates may include those produced from an in situ catalytic reduction reaction and/or from the catalytic reduction reactor unit.

In some embodiments employing hydrothermal digestion, the digestion solvent may further comprise a small amount of a monohydric alcohol. The presence of at least some monohydric alcohols in the fluid phase digestion medium may desirably enhance the hydrothermal digestion and/or the catalytic reduction reactions being conducted therein. For example, inclusion of about 1% to about 5% by weight monohydric alcohols in the fluid phase digestion medium may desirably maintain catalyst activity due to a surface cleaning effect. Monohydric alcohols present in the digestion solvent may arise from any source. In some embodiments, the monohydric alcohols may be formed via the in situ catalytic reduction reaction process being conducted therein. In some or other embodiments, the monohydric alcohols may be formed during further chemical transformations of the initially formed hydrocatalytically treated mixture 13. In still other embodiments, the monohydric alcohols may be sourced from an external feed that is in flow communication with the cellulosic biomass solids.

In some embodiments, the digestion solvent may comprise between about 1% water and about 99% water. Although higher percentages of water may be more favorable from an environmental standpoint, higher quantities of organic solvent may more effectively promote hydrothermal digestion due to the organic solvent's greater propensity to solubilize carbohydrates and promote catalytic reduction of the soluble carbohydrates. In some embodiments, the digestion solvent may comprise about 90% or less water by weight. In other embodiments, the digestion solvent may comprise about 80% or less water by weight, or about 70% or less water by weight, or about 60% or less water by weight, or about 50% or less water by weight, or about 40% or less water by weight, or about 30% or less water by weight, or about 20% or less water by weight, or about 10% or less water by weight, or about 5% or less water by weight.

In some embodiments, the digestion solvent may comprise an organic solvent comprising oxygenated intermediates resulting from a catalytic reduction reaction of soluble carbohydrates. The catalytic reduction reaction may take place in the hydrothermal digestion unit and/or in the catalytic reduction reactor unit. In some embodiments, the organic solvent may comprise at least one alcohol, ketone, or polyol. In alternative embodiments, the digestion solvent may be at least partially supplied from an external source. For example, in some embodiments, bio-ethanol may be used to supplement the organic solvent. Other water-miscible organic solvents may be used as well. In some embodiments, the digestion solvent may be separated, stored, or selectively injected into the hydrothermal digestion unit so as to maintain a desired concentration of soluble carbohydrates or to provide temperature regulation in the hydrothermal digestion unit.

In various embodiments, digestion may take place over a period of time at elevated temperatures and pressures. In some embodiments, digestion may take place at a temperature ranging between about 100 to about 240 degrees C. for a period of time. In some embodiments, the period of time may range of about 0.25 to 24 hours. In some embodiments, the digestion to produce soluble carbohydrates may occur at a pressure ranging between about 1 bar (absolute) and about 100 bar. In general, the higher the temperature, the shorter the amount of time needed for hydrothermal digestion steps to take place. As an example, hydrothermal digestion may take place for about 1 hour to about 10 hours at a temperature of about 180 to about 270 degrees C., most typically from about 190 to 250 degrees C.

In various embodiments, suitable biomass digestion techniques may include, for example, acid digestion, alkaline digestion, enzymatic digestion, and digestion using hot-compressed water. In some embodiments, the methods may further comprise withdrawing at least a portion of the reaction product from the biomass conversion system (e.g., from the outlet of the catalytic reduction reactor unit or from the fluid circulation loop). In some embodiments, the methods may further comprise converting the reaction product into a biofuel, as described in further detail hereinafter. In some embodiments, the methods may further comprise separating solids (e.g., slurry catalyst, biomass fines, and the like) from the reaction product after its withdrawal from the biomass conversion system, as described above.

In some embodiments, the methods may further comprise recirculating at least a portion of the liquor phase from the catalytic reduction reactor unit to the hydrothermal digestion unit. As set forth above, the biomass conversion systems described herein are particularly advantageous in being capable of rapidly at least partially transforming soluble carbohydrates into a reaction product comprising oxygenated intermediates by performing an in situ catalytic reduction reaction in the hydrothermal digestion unit. As also noted above, the liquor phase containing the reaction product may be recirculated from the catalytic reduction reactor unit to the hydrothermal digestion unit, where the liquor phase may, for example, help regulate temperature therein, serve as a digestion solvent, and the like. Recirculation from the catalytic reduction reactor unit to the hydrothermal digestion unit may take place at various recycle ratios. As used herein, the term "recycle ratio" refers to the amount of liquor phase that is recirculated to the hydrothermal digestion unit (e.g., within the fluid circulation loop) relative to the amount of liquor phase that is withdrawn from the biomass conversion system (e.g., by a reaction product takeoff line).

In some embodiments, the catalytic reduction reactions carried out may be hydrogenolysis reactions. In some embodiments, the catalytic reduction reaction may take place at a temperature ranging between about 110° C. and about 300° C., or between about 170° C. and about 300° C., or between about 180° C. and about 290° C., or between about 150° C. and about 250° C. In some embodiments, the catalytic reduction reaction may take place at a pH ranging between about 7 and about 13, or between about 10 and about 12. In other embodiments, the catalytic reduction reaction may take place under acidic conditions, such as at a pH of about 5 to about 7. Acids, bases, and buffers may be introduced as necessary to achieve a desired pH level. In some embodiments, the catalytic reduction reaction may be conducted under a hydrogen partial pressure ranging between about 1 bar (absolute) and about 150 bar, or between about 15 bar and about 140 bar, or between about 30 bar and about 130 bar, or between about 50 bar and about 110 bar.

In some embodiments, catalysts capable of activating molecular hydrogen and conducting a catalytic reduction reaction may comprise a metal such as, for example, Cr, Mo, W, Re, Mn, Cu, Cd, Fe, Co, Ni, Pt, Pd, Rh, Ru, Ir, Os, and alloys or any combination thereof, either alone or with promoters such as Au, Ag, Cr, Zn, Mn, Sn, Bi, B, O, and alloys or any combination thereof. In some embodiments, the catalysts and promoters may allow for hydrogenation and hydrogenolysis reactions to occur at the same time or in succession of one another. In some embodiments, such catalysts may also comprise a carbonaceous pyropolymer catalyst containing transition metals (e.g., Cr, Mo, W, Re, Mn, Cu, and Cd) or Group VIII metals (e.g., Fe, Co, Ni, Pt, Pd, Rh, Ru, Ir, and Os). In some embodiments, the foregoing catalysts may be combined with an alkaline earth metal oxide or adhered to a catalytically active support. In some or other embodiments, the catalyst capable of activating molecular hydrogen may be deposited on a catalyst support that is not itself catalytically active.

In some embodiments, slurry catalysts suitable for use in the methods described herein may be sulfided by dispersing a slurry catalyst in a fluid phase and adding a sulfiding agent thereto. Suitable sulfiding agents may include, for example, organic sulfoxides (e.g., dimethyl sulfoxide), hydrogen sulfide, salts of hydrogen sulfide (e.g., NaSH), amino acids derived from proteins present in biomass feedstock 11 and the like. In some embodiments, the slurry catalyst may be concentrated in the fluid phase after sulfiding, and the concentrated slurry may then be distributed in the cellulosic biomass solids using fluid flow. Illustrative techniques for catalyst sulfiding that may be used in conjunction with the methods described herein are described in U.S. application Ser. No. 12/407,479 (U.S. Application Publication No. 20100236988), filed on Mar. 19, 2009 and incorporated herein by reference in its entirety.

In some embodiments, as mentioned above, hydrocatalytically treated mixture 13, preferably as overhead fraction 15, may be further processed into a biofuel. Further processing of hydrocatalytically treated mixture 13 and/or overhead fraction 15 into a biofuel or other material may comprise any combination and sequence of further hydrogenolysis reactions and/or hydrogenation reactions, condensation reactions, isomerization reactions, oligomerization reactions, hydrotreating reactions, alkylation reactions, dehydration reactions, desulfurization reactions, and the like. The subsequent further processing reactions may be catalytic or non-catalytic. In some embodiments, an initial operation of downstream further processing may comprise a condensation reaction, often conducted in the presence of a condensation catalyst, in which hydrocatalytically treated mixture 13, overhead fraction 15, and/or a product derived therefrom is condensed with another molecule to form a higher molecular weight compound. As used herein, the term "condensation reaction" will refer to a chemical transformation in which two or more molecules are coupled with one another to form a carbon-carbon bond in a higher molecular weight compound, usually accompanied by the loss of a small molecule such as water or an alcohol. An illustrative condensation reaction is the Aldol condensation reaction, which will be familiar to one having ordinary skill in the art. Additional disclosure regarding condensation reactions and catalysts suitable for promoting condensation reactions is provided hereinbelow.

In some embodiments, methods described herein may further comprise performing a condensation reaction on hydrocatalytically treated mixture 13, overhead fraction 15, and/or a product derived therefrom. In various embodiments, the condensation reaction may take place at a temperature ranging between about 5° C. and about 500° C. The condensation reaction may take place in a condensed phase (e.g., a liquor phase) or in a vapor phase. For condensation reactions taking place in a vapor phase, the temperature may range between about 75° C. and about 500° C., or between about 125° C. and about 450° C. For condensation reactions taking place in a condensed phase, the temperature may range between about 5° C. and about 475° C., or between about 15° C. and about 300° C., or between about 20° C. and about 250° C.

In various embodiments, the higher molecular weight compound produced by the condensation reaction may comprise $\geq C_4$ hydrocarbons. In some or other embodiments, the higher molecular weight compound produced by the condensation reaction may comprise $\geq C_6$ hydrocarbons. In some embodiments, the higher molecular weight compound produced by the condensation reaction may comprise $C_4$-$C_{30}$ hydrocarbons. In some embodiments, the higher molecular weight compound produced by the condensation reaction may comprise $C_6$-$C_{30}$ hydrocarbons. In still other embodiments, the higher molecular weight compound produced by the condensation reaction may comprise $C_4$-$C_{24}$ hydrocarbons, or $C_6$-$C_{24}$ hydrocarbons, or $C_4$-$C_{18}$ hydrocarbons, or $C_6$-$C_{18}$ hydrocarbons, or $C_4$-$C_{12}$ hydrocarbons, or $C_6$-$C_{12}$ hydrocarbons. As used herein, the term "hydrocarbons" refers to compounds containing both carbon and hydrogen without reference to other elements that may be present. Thus, heteroatom-substituted compounds are also described herein by the term "hydrocarbons."

The particular composition of the higher molecular weight compound produced by the condensation reaction may vary depending on the catalyst(s) and temperatures used for both the catalytic reduction reaction and the condensation reaction, as well as other parameters such as pressure. For example, in some embodiments, the product of the condensation reaction may comprise $\geq C_4$ alcohols and/or ketones that are produced concurrently with or in lieu of $\geq C_4$ hydrocarbons. In some embodiments, the $\geq C_4$ hydrocarbons produced by the condensation reaction may contain various olefins in addition to alkanes of various sizes, typically branched alkanes. In still other embodiments, the $\geq C_4$ hydrocarbons produced by the condensation reaction may also comprise cyclic hydrocarbons and/or aromatic compounds. In some embodiments, the higher molecular weight compound produced by the condensation reaction may be further subjected to a catalytic reduction reaction to transform a carbonyl functionality therein to an alcohol and/or a hydrocarbon and to convert olefins into alkanes.

Exemplary compounds that may be produced by a condensation reaction include, for example, $\geq C_4$ alkanes, $\geq C_4$ alkenes, $\geq C_5$ cycloalkanes, $\geq C_5$ cycloalkenes, aryls, fused aryls, $\geq C_4$ alcohols, $\geq C_4$ ketones, and mixtures thereof. The $\geq C_4$ alkanes and $\geq C_4$ alkenes may range from 4 to about 30 carbon atoms (i.e. $C_4$-$C_{30}$ alkanes and $C_4$-$C_{30}$ alkenes) and may be branched or straight chain alkanes or alkenes. The $\geq C_4$ alkanes and $\geq C_4$ alkenes may also include fractions of $C_7$-$C_{14}$, $C_{12}$-$C_{24}$ alkanes and alkenes, respectively, with the $C_7$-$C_{14}$ fraction directed to jet fuel blends, and the $C_{12}$-$C_{24}$ fraction directed to diesel fuel blends and other industrial applications. Examples of various $\geq C_4$ alkanes and $\geq C_4$ alkenes that may be produced by the condensation reaction include, without limitation, butane, butene, pentane, pentene, 2-methylbutane, hexane, hexene, 2-methylpentane, 3-methylpentane, 2,2-dimethylbutane, 2,3-dimethylbutane, heptane, heptene, octane, octene, 2,2,4,-trimethylpentane, 2,3-dimethylhexane, 2,3,4-trimethylpentane, 2,3-dimethylpentane, nonane, nonene, decane, decene, undecane, undecene, dodecane, dodecene, tridecane, tridecene, tetradecane, tetradecene, pentadecane, pentadecene, hexadecane, hexadecene, heptyldecane, heptyldecene, octyldecane, octyldecene, nonyldecane, nonyldecene, eicosane, eicosene, uneicosane, uneicosene, doeicosane, doeicosene, trieicosane, trieicosene, tetraeicosane, tetraeicosene, and isomers thereof.

The $\geq C_5$ cycloalkanes and $\geq C_5$ cycloalkenes may have from 5 to about 30 carbon atoms and may be unsubstituted, mono-substituted or multi-substituted. In the case of mono-substituted and multi-substituted compounds, the substituted group may include a branched $\geq C_3$ alkyl, a straight chain $\geq C_1$ alkyl, a branched $\geq C_3$ alkylene, a straight chain $\geq C_1$ alkylene, a straight chain $\geq C_2$ alkylene, an aryl group, or a combination thereof. In some embodiments, at least one of the substituted groups may include a branched $C_3$-$C_{12}$ alkyl, a straight chain $C_1$-$C_{12}$ alkyl, a branched $C_3$-$C_{12}$ alkylene, a straight chain $C_1$-$C_{12}$ alkylene, a straight chain $C_2$-$C_{12}$ alkylene, an aryl group, or a combination thereof. In yet other embodiments, at least one of the substituted groups may include a branched $C_3$-$C_4$ alkyl, a straight chain $C_1$-$C_4$ alkyl, a branched $C_3$-$C_4$ alkylene, a straight chain $C_1$-$C_4$ alkylene, a straight chain $C_2$-$C_4$ alkylene, an aryl group, or any combination thereof. Examples of $\geq C_5$ cycloalkanes and $\geq C_5$ cycloalkenes that may be produced by the condensation reaction include, without limitation, cyclopentane, cyclopentene, cyclohexane, cyclohexene, methylcyclopentane, methylcyclopentene, ethylcyclopentane, ethylcyclopentene, ethylcyclohexane, ethylcyclohexene, and isomers thereof.

The moderate fractions of the condensation reaction, such as $C_7$-$C_{14}$, may be separated for jet fuel, while heavier fractions, such as $C_{12}$-$C_{24}$, may be separated for diesel use. The heaviest fractions may be used as lubricants or cracked to produce additional gasoline and/or diesel fractions. The $\geq C_4$ compounds may also find use as industrial chemicals, whether as an intermediate or an end product. For example, the aryl compounds toluene, xylene, ethylbenzene, para-xylene, meta-xylene, and ortho-xylene may find use as chemical intermediates for the production of plastics and other products. Meanwhile, $C_9$ aromatic compounds and fused aryl compounds, such as naphthalene, anthracene, tetrahydronaphthalene, and decahydronaphthalene, may find use as solvents or additives in industrial processes.

In some embodiments, a single catalyst may mediate the transformation of hydrocatalytically treated mixture 13 and/or overhead fraction 15 into a form suitable for undergoing a condensation reaction as well as mediating the condensation reaction itself. In other embodiments, a first catalyst may be used to mediate the transformation of hydrocatalytically treated mixture 13 and/or overhead fraction 15 into a form suitable for undergoing a condensation reaction, and a second catalyst may be used to mediate the condensation reaction. Unless otherwise specified, it is to be understood that reference herein to a condensation reaction and condensation catalyst refers to either type of condensation process. Further disclosure of suitable condensation catalysts now follows.

In some embodiments, a single catalyst may be used to form a higher molecular weight compound via a condensation reaction. Without being bound by any theory or mechanism, it is believed that such catalysts may mediate an initial dehydrogenation of hydrocatalytically treated mixture 13 and/or overhead fraction 15, followed by a condensation reaction of the dehydrogenated alcoholic component. Zeolite catalysts are one type of catalyst suitable for directly converting alcohols to condensation products in such a manner. A particularly suitable zeolite catalyst in this regard may be ZSM-5, although other zeolite catalysts may also be suitable.

In some embodiments, two catalysts may be used to form a higher molecular weight compound via a condensation reaction. Without being bound by any theory or mechanism, it is believed that the first catalyst may mediate an initial dehydrogenation of hydrocatalytically treated mixture 13 and/or overhead fraction 15, and the second catalyst may mediate a condensation reaction of the dehydrogenated hydrocatalytically treated mixture 13 and/or overhead fraction 15. Like the single-catalyst embodiments discussed previously above, in some embodiments, zeolite catalysts may be used as either the first catalyst or the second catalyst. Again, a particularly suitable zeolite catalyst in this regard may be ZSM-5, although other zeolite catalysts may also be suitable.

Various catalytic processes may be used to form higher molecular weight compounds by a condensation reaction. In some embodiments, the catalyst used for mediating a condensation reaction may comprise a basic site, or both an acidic site and a basic site. Catalysts comprising both an acidic site and a basic site will be referred to herein as multi-functional catalysts. In some or other embodiments, a catalyst used for mediating a condensation reaction may comprise one or more metal atoms. Any of the condensation catalysts may also optionally be disposed on a solid support, if desired.

In some embodiments, the condensation catalyst may comprise a basic catalyst comprising Li, Na, K, Cs, B, Rb, Mg, Ca, Sr, Si, Ba, Al, Zn, Ce, La, Y, Sc, Y, Zr, Ti, hydrotalcite, zinc-aluminate, phosphate, base-treated aluminosilicate zeolite, a basic resin, basic nitride, alloys or any combination thereof. In some embodiments, the basic catalyst may also comprise an oxide of Ti, Zr, V, Nb, Ta, Mo, Cr, W, Mn, Re, Al, Ga, In, Co, Ni, Si, Cu, Zn, Sn, Cd, Mg, P, Fe, or any combination thereof. In some embodiments, the basic catalyst may comprise a mixed-oxide basic catalyst. Suitable mixed-oxide basic catalysts may comprise, for example, Si—Mg—O, Mg—Ti—O, Y—Mg—O, Y—Zr—O, Ti—Zr—O, Ce—Zr—O, Ce—Mg—O, Ca—Zr—O, La—Zr—O, B—Zr—O, La—Ti—O, B—Ti—O, and any combination thereof. In some embodiments, the condensation catalyst may further include a metal or alloys comprising metals such as, for example, Cu, Ag, Au, Pt, Ni, Fe, Co, Ru, Zn, Cd, Ga, In, Rh, Pd, Ir, Re, Mn, Cr, Mo, W, Sn, Bi, Pb, Os, alloys and combinations thereof. Use of metals in the condensation catalyst may be desirable when a dehydrogenation reaction is to be carried out in concert with the condensation reaction. Basic resins may include resins that exhibit basic functionality. The basic catalyst may be self-supporting or adhered to a support containing a material such as, for example, carbon, silica, alumina, zirconia, titania, vanadia, ceria, nitride, boron nitride, a heteropolyacid, alloys and mixtures thereof.

In some embodiments, the condensation catalyst may comprise a hydrotalcite material derived from a combination of MgO and $Al_2O_3$. In some embodiments, the condensation catalyst may comprise a zinc aluminate spinel formed from a combination of ZnO and $Al_2O_3$. In still other embodiments, the condensation catalyst may comprise a combination of ZnO, $Al_2O_3$, and CuO. Each of these materials may also contain an additional metal or alloy, including those more generally referenced above for basic condensation catalysts. In more particular embodiments, the additional metal or alloy may comprise a Group 10 metal such Pd, Pt, or any combination thereof.

In some embodiments, the condensation catalyst may comprise a basic catalyst comprising a metal oxide containing, for example, Cu, Ni, Zn, V, Zr, or any mixture thereof. In some or other embodiments, the condensation catalyst may comprise a zinc aluminate containing, for example, Pt, Pd, Cu, Ni, or any mixture thereof.

In some embodiments, the condensation catalyst may comprise a multi-functional catalyst having both an acidic functionality and a basic functionality. Such condensation catalysts may comprise a hydrotalcite, a zinc-aluminate, a phosphate, Li, Na, K, Cs, B, Rb, Mg, Si, Ca, Sr, Ba, Al, Ce, La, Sc, Y, Zr, Ti, Zn, Cr, or any combination thereof. In further embodiments, the multi-functional catalyst may also include one or more oxides from the group of Ti, Zr, V, Nb, Ta, Mo, Cr, W, Mn, Re, Al, Ga, In, Fe, Co, Ir, Ni, Si, Cu, Zn, Sn, Cd, P, and any combination thereof. In some embodiments, the multi-functional catalyst may include a metal such as, for example, Cu, Ag, Au, Pt, Ni, Fe, Co, Ru, Zn, Cd, Ga, In, Rh, Pd, Ir, Re, Mn, Cr, Mo, W, Sn, Os, alloys or combinations thereof. The basic catalyst may be self-supporting or adhered to a support containing a material such as, for example, carbon, silica, alumina, zirconia, titania, vanadia, ceria, nitride, boron nitride, a heteropolyacid, alloys and mixtures thereof.

In some embodiments, the condensation catalyst may comprise a metal oxide containing Pd, Pt, Cu or Ni. In still other embodiments, the condensation catalyst may comprise an aluminate or a zirconium metal oxide containing Mg and Cu, Pt, Pd or Ni. In still other embodiments, a multi-functional catalyst may comprise a hydroxyapatite (HAP) combined with one or more of the above metals.

In some embodiments, the condensation catalyst may also include a zeolite and other microporous supports that contain Group IA compounds, such as Li, Na, K, Cs and Rb. Preferably, the Group IA material may be present in an amount less than that required to neutralize the acidic nature of the support. A metal function may also be provided by the addition of group VIIIB metals, or Cu, Ga, In, Zn or Sn. In some embodiments, the condensation catalyst may be derived from the combination of MgO and $Al_2O_3$ to form a hydrotalcite material. Another condensation catalyst may comprise a combination of MgO and $ZrO_2$, or a combination of ZnO and $Al_2O_3$. Each of these materials may also contain an additional metal function provided by copper or a Group VIIIB metal, such as Ni, Pd, Pt, or combinations of the foregoing.

The condensation reaction mediated by the condensation catalyst may be carried out in any reactor of suitable design, including continuous-flow, batch, semi-batch or multi-system reactors, without limitation as to design, size, geometry, flow rates, and the like. The reactor system may also use a fluidized catalytic bed system, a swing bed system, fixed bed system, a moving bed system, or a combination of the above. In some embodiments, bi-phasic (e.g., liquid-liquid) and tri-phasic (e.g., liquid-liquid-solid) reactors may be used to carry out the condensation reaction.

In some embodiments, an acid catalyst may be used to optionally dehydrate at least a portion of the reaction product. Suitable acid catalysts for use in the dehydration reaction may include, but are not limited to, mineral acids (e.g., HCl, $H_2SO_4$), solid acids (e.g., zeolites, ion-exchange resins) and acid salts (e.g., LaCl$_3$). Additional acid catalysts may include, without limitation, zeolites, carbides, nitrides, zirconia, alumina, silica, aluminosilicates, phosphates, titanium oxides, zinc oxides, vanadium oxides, lanthanum oxides, yttrium oxides, scandium oxides, magnesium oxides, cerium oxides, barium oxides, calcium oxides, hydroxides, heteropolyacids, inorganic acids, acid modified resins, base modified resins, and any combination thereof. In some embodiments, the dehydration catalyst may also include a modifier. Suitable modifiers may include, for example, La, Y, Sc, P, B, Bi, Li, Na, K, Rb, Cs, Mg, Ca, Sr, Ba, and any combination thereof. The modifiers may be useful, inter alia, to carry out a concerted hydrogenation/dehydrogenation reaction with the dehydration reaction. In some embodiments, the dehydration catalyst may also include a metal. Suitable metals may include, for example, Cu, Ag, Au, Pt, Ni, Fe, Co, Ru, Zn, Cd, Ga, In, Rh, Pd, Ir, Re, Mn, Cr, Mo, W, Sn, Os, alloys, and any combination thereof. The dehydration catalyst may be self supporting, supported on an inert support or resin, or it may be dissolved in a fluid.

Various operations may optionally be performed on hydrocatalytically treated mixture 13 and/or overhead fraction 15 prior to conducting a condensation reaction. In addition, various operations may optionally be performed on a fluid phase containing hydrocatalytically treated mixture 13 and/or overhead fraction 15, thereby further transforming hydrocatalytically treated mixture 13 and/or overhead fraction 15 or placing it in a form more suitable for taking part in a condensation reaction. These optional operations are now described in more detail below.

As described above, one or more liquid phases may be present when digesting cellulosic biomass solids. Particularly when cellulosic biomass solids are fed continuously or semi-continuously to the hydrothermal digestion unit, digestion of the cellulosic biomass solids may produce multiple liquid phases in the hydrothermal digestion unit. The liquid phases may be immiscible with one another, or they may be at least partially miscible with one another. In some embodiments, the one or more liquid phases contained in hydrocatalytically treated mixture 13 and/or overhead fraction 15 may comprise a phenolics liquid phase comprising lignin or a product formed therefrom, an aqueous phase comprising an alcoholic component, a light organics phase, or any combination thereof.

In some embodiments, heating of biomass feedstock 11 and the fluid phase digestion medium to form soluble carbohydrates and a phenolics liquid phase may take place while biomass feedstock 11 is in a pressurized state. As used herein, the term "pressurized state" refers to a pressure that is greater than atmospheric pressure (1 bar). Heating a fluid phase digestion medium in a pressurized state may allow the normal boiling point of the digestion solvent to be exceeded, thereby allowing the rate of hydrothermal digestion to be increased relative to lower temperature digestion processes. In some embodiments, heating biomass feedstock 11 and the fluid phase digestion medium may take place at a pressure of at least about 30 bar. In some embodiments, heating biomass feedstock 11 and the fluid phase digestion medium may take place at a pressure of at least about 60 bar, or at a pressure of at least about 90 bar. In some embodiments, heating biomass feedstock 11 and the fluid phase digestion medium may take place at a pressure ranging between about 30 bar and about 430 bar. In some embodiments, heating biomass feedstock 11 and the fluid phase digestion medium may take place at a pressure ranging between about 50 bar and about 330 bar, or at a pressure ranging between about 70 bar and about 130 bar, or at a pressure ranging between about 30 bar and about 130 bar.

To facilitate a better understanding of the present invention, the following examples of preferred embodiments are given. In no way should the following examples be read to limit, or to define, the scope of the invention.

EXAMPLES

To facilitate a better understanding of the present invention, the following examples of preferred embodiments are given. In no way should the following examples be read to limit, or to define, the scope of the invention.

Example 1

A 100-ml Parr reactor was charged with 60.18 grams of deionized water solvent, and 0.754 grams of nickel-oxide promoted cobalt molybdate catalyst (DC-2534, containing 1-10% cobalt oxide and molybdenum trioxide (up to 30 wt %) on alumina, and less than 2% nickel), obtained from Criterion Catalyst & Technologies L.P. The catalyst was sulfided by the method described in Example 5 of U.S. Application Publication No. 2010/0236988. The reactor was charged with about 5.05 grams of southern pine mini-chips (39% moisture, having a nominal size of about 3 mm×5 mm×5 mm in dimension), and about 0.195 grams of potassium carbonate buffer, before pressuring with 54 bar of hydrogen under magnetic stirring. The stirred reactor was heated to 190° C. for 1 hour. Subsequently, the reactor was heated to 250° C. for 5 hours, which was the end of a cycle. A sample of about 1-2 grams of mixed product was removed via a 0.5 micron sintered metal dip tube at the end of the cycle, while the reactor was still at reaction temperature and stirred. At the end of a cycle, the reactor was cooled, depressurized, and opened for additional wood to be added. Wood addition for cycles 2 through 5 entailed addition of 4.91, 5.09, 5.84, and 5.59 grams of wood. For cycle 6, 2.5 grams of glycerol were added to assess kinetics. For cycle 7, 5.9 grams of nominal 39% moisture ground pine chips were added. For cycle 8, 6.5 grams of pine chips were added. Following the addition of material (wood or glycerol) at the beginning of each cycle, the reactor was repressurized with hydrogen, and again reheated to initiate another cycle. After eight cycles of adding wood or glycerol, the 0.5 micron sintered metal dip tube plugged, and it was not possible to sample the mixed reaction phases. The mixture from the reactant was cooled down and a bottom fraction was separated by liquid-liquid separation. The bottom fraction exhibited a viscosity of greater than about 10,000 cP, measured via timing and flow on an inclined plane while reheating to about 110 degrees C.

The bottom fraction was analyzed by gas chromatography ("DB5-ox method") via dissolving the sample in excess acetone solvent using a 60-m×0.32 mm ID DB-5 column of 1 µm thickness, with 50:1 split ratio, 2 ml/min helium flow, and column oven at 40° C. for 8 minutes, followed by ramp to 285° C. at 10° C./min, and a hold time of 53.5 minutes. The injector temperature was set at 250° C., and the detector temperature was set at 300° C. Analysis revealed the presence of components with a boiling point greater than that of n-butanol, and the bottom fraction included methoxypropyl phenol and tetrahydrofurfural alcohol. The total weight percent of species detected in the bottom fraction was less than 100%, indicating the presence of higher molecular weight oligomers which could not elute from the heated GC injector.

Example 1 shows separation of a bottom fraction containing a lignin-derived phase from a top fraction liquid phase, where the bottom fraction contains phenolics and other heavy oligomers. This bottom fraction can be gasified to form hydrogen according to embodiments of the invention.

Example 2

Example 1 was repeated with 60.06 grams of 25% ethanol in water as solvent, and 0.749 grams of sulfided cobalt molybdate catalyst. The reactor was pressurized to 52 bar with hydrogen, and heated to 190° C. for 1 hour, then to 250° C. for 3 hours, and subsequently to 270° C. for 2 hours. After 8 cycles of adding 6 grams of wood for each cycle as described above in Example 1, formation of a viscous phase on reactor internals was observed. The viscous phase exhibited a viscosity greater than 1000 cP at room temperature. This phase was separated using liquid-liquid separation to generate a bottom fraction. Analysis of this heavy bottoms fraction again revealed the presence of compounds with a boiling point that is higher than that of n-butanol, including tetrahydrofurfural alcohol and methoxypropyl phenol and propyl phenol. The total weight percent of species detected in the bottom fraction was less than 100%, indicating the presence of higher molecular weight oligomers which could not elute from the heated GC injector. Example 2 also shows the formation of a heavy phase which can be separated from a main reaction mixture by gravity settling, and which can be gasified to form hydrogen according to embodiments of the invention.

Example 3

Example 1 was repeated with 50% ethanol in water as solvent. A heavy viscous phase coating internals and the bottom of the reactor was observed after 10 cycles of adding wood chips as described above in Example 1, with viscosity greater than 10,000 cP. Wood additions comprised 6.05, 6.06, 6.06, 6.06, 6.01, 6.00, 6.01, 6.02, 6.06, and 6.06 for completion of ten cycles. After the 10 cycles, the reactor was subjected to 5 hours of treatment under 52 bar of $H_2$ at 290° C., upon which the viscosity of the lower layer was reduced to less than about 500 cP. The high temperature hydrogen treatment led to increased formation of methoxy and alkyl phenols, such that the observed weight percent of compounds in the GC was more than 3-fold higher than for the similar phase formed in Example 2. The treated phase can be distilled to remove the components of lower volatility that can elute from a GC injector. The remaining bottom fraction containing heavy components, which comprise the unseen weight percent in the GC analysis, can be routed to a gasifier to form hydrogen according to embodiments of the invention.

Example 4

A 100-ml Parr reactor was charged with a solvent mixture comprising 29.3 grams of 1,2-propylene glycol, 3.3 grams of ethylene glycol, and 32.5 grams of deionized water. 0.75 grams of nickel-oxide promoted cobalt molybdate catalyst were added (DC-2534, containing 1-10% cobalt oxide and molybdenum trioxide (up to 30 wt %) on alumina, and less than 2% nickel), obtained from Criterion Catalyst & Technologies L.P., and sulfided by the method described in US2010/0236988 Example 5.

The reactor was charged with 6.1 grams of southern pine mini-chips (39% moisture), of nominal size 3×5×5 mm in dimension, before pressuring with 53 bar of hydrogen. The stirred reactor was heated to 190° C. for 1 hour, and subsequently heated to 250° C. for 5 hours to complete a cycle as described above in Example 1.

At the end of each cycle, 5.4 grams of product were withdrawn via a pipette. 6.0 grams of wood were charged to initiate a second reaction cycle using the protocol described in Example 1, along with 0.05 to 0.15 grams of buffer as needed to maintain pH between 5 and 6. Reactor product after each cycle was analyzed by gas chromatography using a 60-m×0.32 mm ID DB-5 column of 1 μm thickness, with 50:1 split ratio, 2 ml/min helium flow, and column oven at 40° C. for 8 minutes, followed by ramp to 285° C. at 10° C./min, and a hold time of 53.5 minutes. The injector temperature was set at 250° C., and the detector temperature was set at 300° C. The reaction sequence was continued through 45 cycles. At the end of cycle 45, 19.1262 grams of aqueous phase were decanted from the viscous heavy components phase. The remaining viscous heavy components phase can be gasified to form hydrogen according to embodiments of the invention.

A distillation of the aqueous layer was conducted at ambient pressure under N2 blanket, using a 50-ml micro flask with short-path distillation head. The distillation was continued until 58% of the initial still contents were collected as overhead distillate. A first distillation cut was taken as bottoms temperature increased from 120 to 168 degrees C. A second distillation cut was taken at bottoms temperatures between 169 and 186 degrees C. The atmospheric distillation was terminated at 196.9 degrees C. bottoms temperature, and gave a fraction comprising diols and acids.

The distillation of this fraction was resumed under vacuum at a nominal pressure of 10 Torr. A maximum temperature of 279 degrees C. was obtained, and 32% of the heavy ends from vacuum distillation were recovered as overhead distillate. The resulting bottom fraction from vacuum distillation was dissolved in dichloromethane and analyzed by GC MS. Many components were too heavy to analyze. Overall structures resembled asphaltenes, with some phenolic groups present.

The distillation bottoms flask was unwrapped and tipped sideways to demonstrate flow of heavy residue at a bottoms temperature of about 268 degrees C., at an estimated viscosity in excess of 1000 cP. About 82% of the final residue could be poured out of the hot flask. Upon cooling, the residue would not flow and required removal by spatula for sampling.

This example shows thermal distillation of intermediate production from digestion-reaction of wood biomass using a catalyst capable of activating molecular hydrogen, under a hydrogen atmosphere. Mono- and di-oxygenates which can be coupled via condensation-oligomeration reactions could be separated by distillation at atmospheric pressure and under vacuum, leaving a heavy tar-like residue. The heavy residue could be kept molten to flow out of distillation kettle when heated above 250 degrees C. This bottom fraction from vacuum distillation containing heavy residues can be gasified to form hydrogen according to embodiments of the present invention. Alternatively, the temperature of the atmospheric distillation can be increased to produce a bottom fraction that may be routed to a gasifier according to embodiments of the present invention.

Example 5

Example 4 was repeated using 4-methyl-2-pentanol (methyl isobutyl carbinol or "MIBC") as the digestion medium, and with use of larger scale batches were run conducted in a 450 mL Parr reactor. The reactor was initially charged with 220.06 g of MIBC, 25.08 g deionized water, 0.855 g of potassium carbonate buffer, and 8.1065 g of sulfided cobalt-molybdate catalyst as described in Example 1. For each reaction cycle, 27 g of softwood pine mini-chips were added, and an equivalent amount of liquid sample was removed at the end of each cycle. For liquid sample removal after each cycle, a portion of the lower aqueous layer was removed from as liquid above the settled catalyst layer, if present, followed by removal of a sufficient amount of the upper layer if required to maintain the liquid inventory in the reactor at a 60% level. After 17 cycles, a sample of the upper layer was distilled at atmospheric pressure under nitrogen, followed by vacuum distillation at 10 Torr. Distillate cut number 2 was collected under nitrogen at atmospheric pressure with a kettle bottoms temperature of about 110 to 140 degrees C. and an overheads temperature of about 90 degrees C. Cut number 2 contains a mixture of oxygenated and alkane intermediates. With a kettle temperature of about 258 to 302 degrees C., a vacuum distillation cut containing an estimated 30% of the reactor product was obtained as distillate cut number 6. In addition to alcohols (including glycols and other diols), significant quantities of phenolic compounds were obtained in cut number 6. For example, methoxy propyl phenol was found to be present in quantities greater than 4%. Tetrahydrofurfural alcohol was also found as a significant reaction product. No observable viscous layer or tar was formed under the experimental conditions of Example 5. A final vacuum distillation cut representing the end point of distillation (final 1% of feed) is produced and reported in Table 1 below.

TABLE 1

Final vacuum distillation cut at
348 degrees C. bottom temperature

| Name | area % |
|---|---|
| acetone (diluent) | N/A |
| 1-butanol (int standard) | N/A |
| 4-methyl-2-Pentanol | N/A |
| tetrahydro Furanmethanol | 3.27% |
| phenol | 6.93% |
| methoxy phenol | 8.61% |
| methyl phenol | 12.39% |
| unknown | 3.89% |
| dimethy phenol | 7.37% |
| methyl methoxy phenol | 6.27% |
| ethyl phenol | 6.15% |
| methyl ethyl phenol | 5.51% |
| unknown | 2.58% |
| ethyl methoxy phenol | 5.24% |
| unknown | 3.76% |
| propyl phenol | 6.09% |
| unknown | 0.91% |
| benzene diol | 5.24% |
| propyl methoxy phenol | 6.30% |
| unknown | 1.15% |
| unknown | 2.50% |
| unknown | 5.84% |

The distillation flask bottoms after distillation with a final temperature of about 345 degrees C. continued to boil and bubble, but formed a solid char with resemblance to coal, upon cooling to room temperature. This example shows digestion and reaction intermediates. Distillation allows removal of monooxygenates and diols, with some phenols. Some heavy tar components with separation points in excess of 350 degrees C. remain in the bottoms, and for a char phase upon cooling. At least one of distillation cut number 6, the final vacuum distillation cut, and the heavy tar components remaining in the bottoms can be gasified to form hydrogen according to embodiments of the invention.

Example 6

Example 5 was repeated with 34 cycles of wood addition. Distillation was conducted at atmospheric pressure under $N_2$ to remove 85% of the reactor contents as overhead product, analyzed as a mixture of monooxygenates and some diols. The remaining 15% kettle bottoms formed a non-flowable viscous tar at room temperature, for which dissolution in acetone solvent required reheating. The remaining 15% kettle bottoms can be gasified to form hydrogen according to embodiments of the invention.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A method comprising:
(a) providing a biomass feedstock comprising cellulose and water;
(b) contacting the biomass feedstock with hydrogen in the presence of a catalyst capable of activating molecular hydrogen in a hydrocatalytic treatment at a temperature in a range of about 180 to 290 degrees C. to form a hydrocatalytically treated mixture comprising a plurality of hydrocarbon and oxygenated hydrocarbon molecules;
(c) separating the hydrocatalytically treated mixture into at least a first overhead fraction comprising at least one of the hydrocarbon and oxygenated hydrocarbon molecules and a first bottom stream comprising at least one compound having a separation point having a temperature in a range of about 100 to 600 degrees C. at a pressure of about atmospheric pressure, wherein the first bottom fraction comprises at least one of phenol, o-cresol, p-cresol, anisole, 4-methylanisole, catechol, guaiacol, 4-methylguaiacol, 1,3-dimethoxybenzene, syringol, vanillin, methoxyphenol, methyl phenol, dimethyl phenol, ethyl phenol, methyl ethyl phenol, methoxypropylphenol, benzene diol, and propyl phenol;
(d) partially oxidizing the first bottom fraction to produce a gas mixture comprising carbon monoxide and hydrogen;
(e) providing the gas mixture to a water gas shift reaction zone external to where the biomass feedstock is contacted with hydrogen to generate hydrogen and carbon dioxide; and
(f) providing the hydrogen from step (e) for use in step (b).

2. The method of claim 1 wherein the first bottom fraction comprises at least one compound having a separation point having a temperature in a range of about 100 to 500 degrees C. at a pressure in a range of about 1 to 100 Torr.

3. The method of claim 1 wherein the first overhead fraction is subject to a further processing reaction to produce a product stream comprising a higher molecular weight compound comprising $\geq C_4$ hydrocarbons.

4. The method of claim 3 further comprising:
separating the product stream comprising a higher molecular weight compound comprising $\geq C_4$ hydrocarbons into a second overhead fraction and a second bottom fraction, wherein the second bottom fraction comprises at least one compound having a separation point having a temperature in a range of about 100 to 500 degrees C. at a pressure in a range of about 75 to 5250 Torr and wherein the second bottom fraction comprises $C_{14}$ or greater hydrocarbons;
partially oxidizing the second bottom fraction to produce a gas mixture comprising carbon monoxide and hydrogen;
subjecting the gas mixture generated from partial oxidation of the second bottom fraction to a water gas shift reaction to generate hydrogen and carbon dioxide; and
providing the hydrogen from the second bottom fraction to step (b).

5. The method of claim 4 wherein the second bottom fraction comprises at least one compound having a separation point having a temperature in a range of about 150 to 400 degrees C. at a pressure in a range of about 75 to 5250 Torr.

6. The method of claim 1 wherein the partially oxidizing step of the first bottom fraction comprises using a gasifier.

7. The method of claim 6 wherein the gasifier is selected from the group consisting of a moving-bed gasifier, a fluid-bed gasifier, an entrained-flow gasifier, and any combination thereof.

8. The method of claim 6 further comprising routing the first bottom fraction to the gasifier, wherein said first bottom fraction is a solid, liquid, or combination thereof.

9. The method of claim 8 wherein the gasifier comprises an entrained-flow gasifier and said first bottom fraction is routed as a liquid.

10. The method of claim 4 wherein the partially oxidizing step of the second bottom fraction comprises using a gasifier.

11. The method of claim 10 wherein the same gasifier is used for the partially oxidizing step of the first bottom fraction and the partially oxidizing step of the second bottom fraction.

12. The method of claim 1 wherein the first bottom fraction subject to partial oxidation has a viscosity of about 1 to 10,000 centipoise (cP) at a temperature of about 75 degrees C.

13. The method of claim 1 wherein the first bottom fraction subject to partial oxidation has a viscosity of about 320 centistokes or less at a temperature at which the first bottom fraction is produced.

14. The method of claim 1 wherein the first bottom fraction subject to partial oxidation comprises at least one component selected from lignin, a lignin-derived compound, unextracted cellulose, unextracted hemicellulose, and a caramelan.

15. The method of claim 1 wherein the hydrocatalytic treatment occurs in liquid phase.

16. The method of claim 1 wherein the hydrocatalytic treatment occurs in an aqueous phase solvent.

17. The method of claim 1 wherein the hydrocatalytic treatment occurs in an organic phase solvent.

18. The method of claim 1 wherein the first bottom fraction comprises at least one compound having a separation point having a temperature in a range of about 200 to 450 degrees C. at a pressure of about 3 to 20 Torr.

* * * * *